US008583146B2

(12) United States Patent
Palanki et al.

(10) Patent No.: US 8,583,146 B2
(45) Date of Patent: *Nov. 12, 2013

(54) INDOOR POSITIONING USING JOINT LIKELIHOODS

(71) Applicant: QUALCOMM Incorporated, San Diego, CA (US)

(72) Inventors: Ravi Palanki, San Diego, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,762

(22) Filed: Dec. 19, 2012

(65) Prior Publication Data

US 2013/0267243 A1 Oct. 10, 2013

Related U.S. Application Data

(63) Continuation of application No. 13/491,393, filed on Jun. 7, 2012, now Pat. No. 8,412,239.

(60) Provisional application No. 61/622,457, filed on Apr. 10, 2012.

(51) Int. Cl.
*H04W 24/00* (2009.01)

(52) U.S. Cl.
USPC ....... 455/456.6; 455/522; 455/11.1; 370/508; 370/252; 370/280; 342/357.44; 342/357.25

(58) Field of Classification Search
USPC ......... 455/456.6, 522, 11.1, 458, 12.1, 456.3, 455/436; 370/331, 252, 508, 280; 342/450, 342/357.44, 357.25, 357.62; 340/7.52
See application file for complete search history.

(56) References Cited

U.S. PATENT DOCUMENTS

| 5,459,473 | A | 10/1995 | Dempster et al. |
| 5,890,068 | A | 3/1999 | Fattouche et al. |
| 6,980,527 | B1 | 12/2005 | Liu et al. |
| 6,980,814 | B2 * | 12/2005 | Nohara et al. ............. 455/456.1 |
| 7,055,601 | B2 | 6/2006 | Barrow |
| 7,751,827 | B2 * | 7/2010 | Poykko et al. ............. 455/456.1 |
| 8,412,239 | B1 | 4/2013 | Palanki |

(Continued)

OTHER PUBLICATIONS

International Search Report and Written Opinion—PCT/US2013/020275—ISA/EPO—Mar. 7, 2013.

(Continued)

*Primary Examiner* — Mahendra Patel
(74) *Attorney, Agent, or Firm* — Hunter Clark PLLC

(57) ABSTRACT

A method in a mobile terminal for estimating a position of the mobile terminal includes: receiving an expected measurement map indicative of expected measurement values of a parameter; receiving parameters of a matrix corresponding to the expected measurement map; capturing actual measurement values of the parameter for a plurality of communication devices; and utilizing the received parameters and actual measurement values to estimate a position of the mobile terminal, where the expected measurement map includes, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices.

25 Claims, 9 Drawing Sheets

(56) References Cited

U.S. PATENT DOCUMENTS

| | | | |
|---|---|---|---|
| 2007/0057839 A1 | 3/2007 | Kagawa et al. | |
| 2007/0174038 A1 | 7/2007 | Wang et al. | |
| 2007/0287473 A1* | 12/2007 | Dupray | 455/456.1 |
| 2009/0028262 A1 | 1/2009 | Imai et al. | |
| 2010/0178934 A1* | 7/2010 | Moeglein et al. | 455/456.1 |
| 2010/0225541 A1* | 9/2010 | Hertzog et al. | 342/387 |
| 2010/0265841 A1 | 10/2010 | Rong et al. | |
| 2012/0056785 A1 | 3/2012 | Jovicic et al. | |
| 2012/0208523 A1* | 8/2012 | Hans et al. | 455/422.1 |

OTHER PUBLICATIONS

Prasithsangaree P et al., "On indoor position location with wireless lans", Personal, Indoor and Mobile Radio Communications, 2002. The 13TH IEEE International Symposium on Sep. 15-18, 2002, Piscataway, NJ, USA, IEEE, vol. 2, Sep. 15, 2002, pp. 720-724, XP010614319, ISBN: 978-0-7803-7589-5.

Youssef, M., et al., "The Horus location determination system", Wireless Networks ; The Journal of Mobilecommunication, Computation and Information, Kluwer Academic Publishers, DO, vol. 14, No. 3, Jan. 4, 2007, pp. 357-374, XP019617184, ISSN: 1572-8196.

* cited by examiner

Expected measurement map $\hat{M}$    Measurements $\vec{\mu}_{AT}$

Interim vector computation unit
140

$Y_{i,j}$ where:

$$\hat{M} = \begin{bmatrix} \vec{\mu}_{Loc(1,1)} & \vec{\mu}_{Loc(2,1)} & \cdots & \vec{\mu}_{Loc(x,1)} \\ \vec{\mu}_{Loc(1,2)} & \vec{\mu}_{Loc(2,2)} & \cdots & \vec{\mu}_{Loc(x,2)} \\ \cdots & \cdots & \vec{\mu}_{Loc(i,j)} & \cdots \\ \vec{\mu}_{Loc(1,y)} & \vec{\mu}_{Loc(2,y)} & \cdots & \vec{\mu}_{Loc(x,y)} \end{bmatrix}$$

where $\vec{\mu}_{Loc(i,j)} = \begin{bmatrix} \hat{\mu}_{AP:1} \\ \hat{\mu}_{AP:2} \\ \hat{\mu}_{AP:3} \\ \cdots \\ \hat{\mu}_{AP:N} \end{bmatrix}$ and $\hat{\mu}_{AP:k} = (probable\ measurement\ between\ Loc(i,j)\ and\ AP:k)$ and where:

$$\vec{\mu}_{AT} = \begin{bmatrix} \mu_{AP:1} \\ \mu_{AP:2} \\ \mu_{AP:3} \\ \cdots \\ \mu_{AP:N} \end{bmatrix} \quad and \quad Y_{i,j} = \begin{bmatrix} \mu_{AP:1} - \hat{\mu}_{AP:1} \\ \mu_{AP:2} - \hat{\mu}_{AP:2} \\ \mu_{AP:3} - \hat{\mu}_{AP:3} \\ \cdots \\ \mu_{AP:N} - \hat{\mu}_{AP:N} \end{bmatrix}$$

FIG. 3

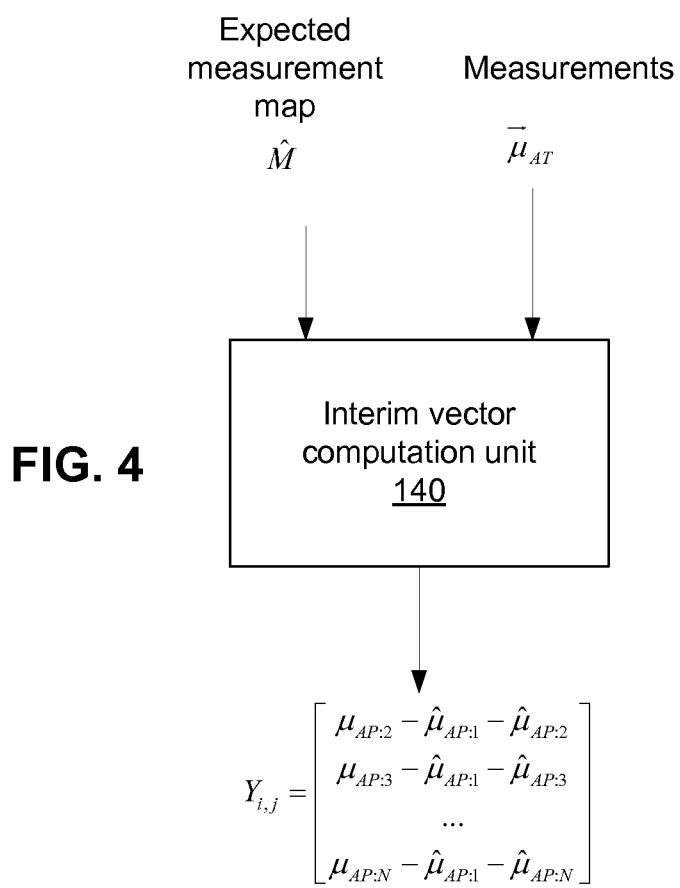

$$\vec{\mu}_{AT} = \begin{bmatrix} \mu_{AP:1} \\ \mu_{AP:2} \\ \mu_{AP:3} \\ \ldots \\ \mu_{AP:N} \end{bmatrix} = \begin{bmatrix} RSSI_{AP:1} \\ RSSI_{AP:2} \\ RSSI_{AP:3} \\ \ldots \\ RSSI_{AP:N} \end{bmatrix}$$

$$\vec{\mu}_{\min} = \begin{bmatrix} \hat{\mu}_{AP:1} \\ \hat{\mu}_{AP:2} \\ \hat{\mu}_{AP:3} \\ \ldots \\ \hat{\mu}_{AP:N} \end{bmatrix} = \begin{bmatrix} RSSI\_ext_{AP:1} \\ RSSI\_ext_{AP:2} \\ RSSI\_ext_{AP:3} \\ \ldots \\ RSSI\_ext_{AP:N} \end{bmatrix}$$

$$Y_{i,j} = \vec{\mu}_{AT} - \vec{\mu}_{\min} = \begin{bmatrix} \mu_{AP:1} - \hat{\mu}_{AP:1} \\ \mu_{AP:2} - \hat{\mu}_{AP:2} \\ \mu_{AP:3} - \hat{\mu}_{AP:3} \\ \ldots \\ \mu_{AP:N} - \hat{\mu}_{AP:N} \end{bmatrix} = \begin{bmatrix} \mu_{AP:1} - RSSI\_est_{AP:1} \\ \mu_{AP:2} - RSSI\_est_{AP:2} \\ \mu_{AP:3} - RSSI\_est_{AP:3} \\ \ldots \\ \mu_{AP:N} - RSSI\_est_{AP:N} \end{bmatrix}$$

$$\vec{\mu}_{AT} = \begin{bmatrix} \mu_{AP:2} - \mu_{AP:1} \\ \mu_{AP:3} - \mu_{AP:1} \\ \ldots \\ \mu_{AP:N} - \mu_{AP:1} \end{bmatrix} = \begin{bmatrix} RSSI_{AP:2} - RSSI_{AP:1} \\ RSSI_{AP:3} - RSSI_{AP:1} \\ \ldots \\ RSSI_{AP:N} - RSSI_{AP:1} \end{bmatrix}$$

$$\vec{\mu}_{\min} = \begin{bmatrix} \hat{\mu}_{AP:2} \\ \hat{\mu}_{AP:3} \\ \ldots \\ \hat{\mu}_{AP:N} \end{bmatrix} = \begin{bmatrix} RSSI\_est_{AP:2} \\ RSSI\_est_{AP:3} \\ \ldots \\ RSSI\_est_{AP:N} \end{bmatrix}$$

$$Y_{i,j} = \vec{\mu}_{AT} - \vec{\mu}_{\min} - \hat{\mu}_{AP:1} = \begin{bmatrix} \mu_{AP:2} - \hat{\mu}_{AP:1} - \hat{\mu}_{AP:2} \\ \mu_{AP:3} - \hat{\mu}_{AP:1} - \hat{\mu}_{AP:3} \\ \ldots \\ \mu_{AP:N} - \hat{\mu}_{AP:1} - \hat{\mu}_{AP:N} \end{bmatrix} = \begin{bmatrix} RSSI_{AP:2} - RSSI_{AP:1} - RSSI\_est_{AP:2} \\ RSSI_{AP:3} - RSSI_{AP:1} - RSSI\_est_{AP:3} \\ \ldots \\ RSSI_{AP:N} - RSSI_{AP:1} - RSSI\_est_{AP:N} \end{bmatrix}$$

FIG. 10

$$\vec{\mu}_{AT} = \begin{bmatrix} \mu_{AP:1} \\ \mu_{AP:2} \\ \mu_{AP:3} \\ \dots \\ \mu_{AP:N} \end{bmatrix} = \begin{bmatrix} RTT_{AP:1} \\ RTT_{AP:2} \\ RTT_{AP:3} \\ \dots \\ RTT_{AP:N} \end{bmatrix}$$

$$\vec{\mu}_{\min} = \begin{bmatrix} \hat{\mu}_{AP:1} \\ \hat{\mu}_{AP:2} \\ \hat{\mu}_{AP:3} \\ \dots \\ \hat{\mu}_{AP:N} \end{bmatrix} = \begin{bmatrix} RTT\_est_{AP:1} \\ RTT\_est_{AP:2} \\ RTT\_est_{AP:3} \\ \dots \\ RTT\_est_{AP:N} \end{bmatrix}$$

$$Y_{i,j} = \vec{\mu}_{AT} - \vec{\mu}_{\min} = \begin{bmatrix} \mu_{AP:1} - \hat{\mu}_{AP:1} \\ \mu_{AP:2} - \hat{\mu}_{AP:2} \\ \mu_{AP:3} - \hat{\mu}_{AP:3} \\ \dots \\ \mu_{AP:N} - \hat{\mu}_{AP:N} \end{bmatrix} = \begin{bmatrix} \mu_{AP:1} - RTT\_est_{AP:1} \\ \mu_{AP:2} - RTT\_est_{AP:2} \\ \mu_{AP:3} - RTT\_est_{AP:3} \\ \dots \\ \mu_{AP:N} - RTT\_est_{AP:N} \end{bmatrix}$$

$$\vec{\mu}_{AT} = \begin{bmatrix} \mu_{AP:2} - \mu_{AP:1} \\ \mu_{AP:3} - \mu_{AP:1} \\ \dots \\ \mu_{AP:N} - \mu_{AP:1} \end{bmatrix} = \begin{bmatrix} RSSI_{AP:2} - RTT_{AP:1} \\ RSSI_{AP:3} - RTT_{AP:1} \\ \dots \\ RSSI_{AP:N} - RTT_{AP:1} \end{bmatrix}$$

$$\vec{\mu}_{\min} = \begin{bmatrix} \hat{\mu}_{AP:2} \\ \hat{\mu}_{AP:3} \\ \dots \\ \hat{\mu}_{AP:N} \end{bmatrix} = \begin{bmatrix} RTT\_est_{AP:2} \\ RTT\_est_{AP:3} \\ \dots \\ RTT\_est_{AP:N} \end{bmatrix}$$

$$Y_{i,j} = \vec{\mu}_{AT} - \vec{\mu}_{\min} - \hat{\mu}_{AP:1} = \begin{bmatrix} \mu_{AP:2} - \hat{\mu}_{AP:1} - \hat{\mu}_{AP:2} \\ \mu_{AP:3} - \hat{\mu}_{AP:1} - \hat{\mu}_{AP:3} \\ \dots \\ \mu_{AP:N} - \hat{\mu}_{AP:1} - \hat{\mu}_{AP:N} \end{bmatrix} = \begin{bmatrix} RTT_{AP:2} - RTT_{AP:1} - RTT\_est_{AP:2} \\ RTT_{AP:3} - RTT_{AP:1} - RTT\_est_{AP:3} \\ \dots \\ RTT_{AP:N} - RTT_{AP:1} - RTT\_est_{AP:N} \end{bmatrix}$$

INDOOR POSITIONING USING JOINT LIKELIHOODS

CROSS-REFERENCE TO RELATED APPLICATIONS

This application is a continuation of U.S. application Ser. No. 13/491,393, filed on Jun. 7, 2012, entitled "INDOOR POSITIONING USING JOINT LIKELIHOODS", which claims the benefit of and priority to U.S. Provisional Patent Application No. 61/622,457, filed Apr. 10, 2012, entitled "Indoor positioning using joint likelihoods," both of which are assigned to the assignee hereof and which are incorporated herein by reference in their entireties.

BACKGROUND

I. Technical Field

This disclosure relates generally to apparatus and methods for position estimation of a mobile terminal, and more particularly to estimation of positions where satellite positioning systems may be inadequate, such as for indoor positioning.

II. Background

Positioning estimation (PE) engines are currently used to determine a position of a mobile terminal using GPS navigation, dead reckoning, signal measurements or a combination of any two or the three. For indoor navigation over a long term, a PE engine may be forced to rely solely on various signal measures, such as signal strength (e.g., RSSI or received signal strength indication values) and/or signal transmission time (e.g., RTT or round trip time values).

SUMMARY

Disclosed is an apparatus, method and system for estimating a position of a mobile terminal within a space, such as a building, in which a plurality of access points are observable or capable of communicating with the mobile terminal In an example, a method according to the disclosure comprises receiving an expected measurement map. The measurement map comprises sets of expected measurement values. Each set of expected measurement values is associated with a different hypothesis location of a plurality of hypothesis locations, around which the mobile terminal may be located. Each set of expected measurement values comprises a set of values; each value corresponds to a different access point of a set of access points, and indicates an expected measurement of a parameter, under a condition that the mobile terminal is proximal the hypothesis location associated with the set of expected measurement values to which that value pertains. The method also comprises receiving parameters indicating a covariance matrix corresponding to the expected measurement map, and capturing, by the mobile terminal, actual measurements of the parameter for the plurality of access points.

For each of the plurality of hypothesis locations, the method comprises computing an interim vector from the captured measurements and the respective expected measurement vector for that hypothesis location, and computing joint probability distribution values as an exponential of a matrix product using the interim vector and the covariance matrix. To arrive at an estimated position of the mobile terminal, the computed joint probability distribution values are filtered.

In an example, the covariance matrix is $R_{nn}$, the expected measurements map is $\hat{M}$, each of a plurality of hypothesis locations is $Loc(i,j)$, each expected measurement vector is $\vec{\mu}_{Loc(i,j)}$ the plurality of access points are AP:1 AP:2 ... AP:N, and the expected measurement vector is comprises $\vec{\mu}_{Loc(i,j)} = [\hat{\mu}_{AP:1} \ \hat{\mu}_{AP:2} \ \hat{\mu}_{AP:3} \ \ldots \ \hat{\mu}_{AP:N}]^T$. The captured measurements comprise $\vec{\mu}_{AT} = [\mu_{AP:1} \ \mu_{AP:2} \ \mu_{AP:3} \ \ldots \ \mu_{AP:N}]^T$. Each interim vector is $\vec{Y}_{i,j}$ and each joint probability distribution value is $P_{i,j}$.

In some aspects, the interim vector is calculated to remove one or more unknown parameters through specified differential calculations. In one example, an antenna gain of the mobile terminal is removed from received signal strength values. In another example, a processing delay of access points is removed from round trip time values.

The covariance matrix can be static, or shared among all access points. A number of covariance matrices can be available for a particular space, and can be used, dependent on selection of an appropriate covariance matrix. Covariance matrices can be updated based on information received from mobile terminals.

Aspects of such methods can be implemented in mobile terminals, servers, or a combination thereof. A means for computing interim vectors includes a computation device configured to perform the disclosed calculations. More generally, disclosed components and algorithms provide respective means for implementing respective functions attributed to those components and algorithms.

According to some aspects, a mobile terminal is configured for estimating a position of the mobile terminal. The mobile terminal comprises a first reception unit to receive an expected measurement map ($\hat{M}$) and a second reception unit to receive parameters indicating a covariance matrix ($R_{nn}$). The mobile terminal also comprises a measurement capture unit to capture measurements ($\vec{\mu}_{AT}$), from the position of the mobile terminal, from the plurality of access points (AP:1 AP:2 ... AP:N), wherein the measurements ($\vec{\mu}_{AT}$) comprise ($\hat{M}_{AT} = [\mu_{AP:1} \ \mu_{AP:2} \ \mu_{AP:3} \ \ldots \ \mu_{AP:N}]^T$); an interim vector computation unit coupled to the first reception unit and the measurement capture unit, and to compute an interim vector ($\vec{Y}_{i,j}$) from the measurements ($\vec{\mu}_{AT}$) and the expected measurement vector ($\vec{\mu}_{Loc(i,j)}$).

A joint probability distribution computation unit is coupled to the interim vector computation unit and the second reception unit, and to compute joint probability distribution values ($P_{i,j}$) as an exponential of a matrix product is configured using the interim vector ($\vec{Y}_{i,j}$) and the covariance matrix ($R_{nn}$). A filter is coupled to the joint probability distribution computation unit and configured to filter the joint probability distribution values to estimate the position of the mobile terminal.

Some embodiments disclose a method in a mobile terminal for estimating a position of the mobile terminal, the method comprising: receiving an expected measurement map indicative of an expected measurement of a parameter by the mobile terminal; receiving parameters of a matrix corresponding to the expected measurement map; capturing, by the mobile terminal, actual measurements of the parameter for a plurality of communication devices; and utilizing the received parameters and actual measurements to estimate the position of the mobile terminal Some embodiments disclose a mobile terminal for estimating a position of the mobile terminal, comprising: a matrix reception unit to receive parameters of a matrix; an expected measurement map reception unit to receive an expected measurement map indicative of an expected measurement of a parameter by the mobile terminal; a measurement capture unit to capture measurements from the position of the mobile terminal, from a plurality of communication devices; and a computation unit coupled to the matrix reception unit and the measurement capture unit, and to use the received parameters and actual measurements to estimate the position of the mobile terminal.

Some embodiments disclose a mobile terminal for estimating a position of the mobile terminal, the mobile terminal comprising: means for receiving an expected measurement map indicative of an expected measurement of a parameter by the mobile terminal; means for receiving parameters of a matrix corresponding to the expected measurement map; means for capturing, by the mobile terminal, actual measurements of the parameter for a plurality of communication devices; and means for estimating the position of the mobile terminal using the received parameters and actual measurements.

Some embodiments disclose a device comprising: a processor; a transceiver operable to send and receive wireless signals, wherein the processor is coupled to receive data from the transceiver; and a non-transitory memory having stored thereon instructions for configuring the processor for: receiving an expected measurement map indicative of an expected measurement of a parameter by the mobile terminal; receiving parameters of a matrix corresponding to the expected measurement map; capturing actual measurements of the parameter for a plurality of communication devices; and utilizing the received parameters and actual measurements to estimate the position of the mobile terminal.

Some embodiments disclose a non-transitory computer-readable storage medium including program code stored thereon, comprising program code for: receiving an expected measurement map indicative of an expected measurement of a parameter by the mobile terminal; receiving parameters of a matrix corresponding to the expected measurement map; capturing, by the mobile terminal, actual measurements of the parameter for a plurality of communication devices; and utilizing the received parameters and actual measurements to estimate the position of the mobile terminal.

An example method in a mobile terminal for estimating a position of the mobile terminal includes: receiving an expected measurement map indicative of expected measurement values of a parameter; receiving parameters of a matrix corresponding to the expected measurement map; capturing actual measurement values of the parameter for a plurality of communication devices; and utilizing the received parameters and actual measurement values to estimate a position of the mobile terminal, where the expected measurement map includes, for each of a plurality of hypothesis locations (Loc (i,j)), a set of expected measurement values ($\vec{\mu}_{Loc(i,j)}$) containing expected measurements for the parameter, each of the expected measurements corresponding to a respective communication device of the plurality of communication devices.

Implementations of such a method may include one or more of the following features. The method further includes: computing, for each of a plurality of hypothesis locations, an interim vector ($\vec{Y}_{i,j}$) from the actual measurements and the expected measurement map; computing a joint probability distribution value ($P_{i,j}$) as an exponential of a matrix product of $\vec{Y}_{i,j}$ and $R_{nn}$; and filtering the joint probability distribution value to estimate the position of the mobile terminal. Computing the respective interim vector comprises removing an unknown antenna gain of the mobile terminal. Computing the respective interim vector comprises removing an unknown processing delay of the plurality of communication devices.

An example of a mobile terminal for estimating a position of the mobile terminal includes: means for receiving an expected measurement map indicative of expected measurement values of a parameter; means for receiving parameters of a matrix corresponding to the expected measurement map; means for capturing actual measurement values of the parameter for a plurality of communication devices; and means for utilizing the received parameters and actual measurement values to estimate a position of the mobile terminal, where the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices.

Implementations of such a mobile terminal may include one or more of the following features. The mobile terminal further includes: means for computing, for each of a plurality of hypothesis locations, an interim vector ($\vec{Y}_{i,j}$) from the actual measurements and the expected measurement map; means for computing a joint probability distribution value ($P_{i,j}$) as an exponential of a matrix product of $\vec{Y}_{i,j}$ and $R_{nn}$; and means for filtering the joint probability distribution value to estimate the position of the mobile terminal. The means for computing the respective interim vector comprises means for removing an unknown antenna gain of the mobile terminal. The means for computing the respective interim vector comprises means for removing an unknown processing delay of the plurality of communication devices.

An example device includes: a processor; a transceiver operable to send and receive wireless signals, wherein the processor is coupled to receive data from the transceiver; and a non-transitory memory having stored thereon instructions for configuring the processor to: receive an expected measurement map indicative of expected measurement values of a parameter; receive parameters of a matrix corresponding to the expected measurement map; capture actual measurement values of the parameter for a plurality of communication devices; and utilize the received parameters and actual measurement values to estimate a position of the mobile terminal, where the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices.

Implementations of such a device may include one or more of the following features. The instructions stored on the non-transitory memory further comprise instructions for configuring the processor to: compute, for each of a plurality of hypothesis locations, an interim vector ($\vec{Y}_{i,j}$) from the actual measurements and the expected measurement map; compute a joint probability distribution value ($P_{i,j}$) as an exponential of a matrix product of $\vec{Y}_{i,j}$ and $R_{nn}$; and filter the joint probability distribution value to estimate the position of the mobile terminal. The instructions for configuring the processor to compute the respective interim vector comprise instructions for configuring the processor to remove an unknown antenna gain of the mobile terminal. The instructions for configuring the processor to compute the respective interim vector comprise instructions for configuring the processor to remove an unknown processing delay of the plurality of communication devices.

An example of a non-transitory computer-readable medium, having stored thereon computer-readable instructions for estimating a position of the mobile terminal, includes instructions configured to cause a computer to: receive an expected measurement map indicative of expected measurement values of a parameter; receive parameters of a matrix corresponding to the expected measurement map; capture actual measurement values of the parameter for a plurality of communication devices; and utilize the received parameters and actual measurement values to estimate a position of the mobile terminal, where the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices.

Implementations of such a non-transitory computer-readable storage medium may include one or more of the following features. The storage medium further includes instructions to cause a computer to: compute, for each of a plurality of hypothesis locations, an interim vector ($\vec{Y}_{i,j}$) from the actual measurements and the expected measurement map; compute a joint probability distribution value ($P_{i,j}$) as an exponential of a matrix product of $\vec{Y}_{i,j}$ and $R_{nn}$; and filter the joint probability distribution value to estimate the position of the mobile terminal. The instructions to cause the computer to compute the interim vector further include instructions to cause the computer to remove an unknown antenna gain of the mobile terminal. The instructions to cause the computer to compute the interim vector further include instructions to cause the computer to remove an unknown processing delay of the plurality of communication devices.

An example method in a mobile terminal for estimating a position of the mobile terminal includes: receiving an expected measurement map indicative of an expected measurement values of a parameter by the mobile terminal; receiving parameters values of a matrix corresponding to the expected measurement map; capturing, by the mobile terminal, actual measurement values of the parameter for a plurality of communication devices; and utilizing the received parameter values and actual measurement values to estimate the position of the mobile terminal, wherein utilizing the received parameters and actual measurements to estimate the position of the mobile terminal further comprises filtering, with a Kalman filter, joint probability distribution values determined based at least in part on the received parameters and the actual measurements.

Implementations of such a method may include one or more of the following features. Receiving the expected measurement map comprises receiving a set of expected measurement values associated with one of the plurality of communication devices and a plurality of hypothesis locations. Receiving the expected measurement map comprises receiving a set of expected measurement values associated with the plurality of communication devices and a hypothesis location. The method is implemented in a server in communication with the mobile terminal, and further includes receiving, from the mobile terminal, captured measurements, from the position of the mobile terminal, for the plurality of communication devices.

An example mobile terminal for estimating a position of the mobile terminal includes: means for receiving an expected measurement map indicative of an expected measurement values of a parameter by the mobile terminal; means for receiving parameters values of a matrix corresponding to the expected measurement map; means for capturing, by the mobile terminal, actual measurement values of the parameter for a plurality of communication devices; and means for utilizing the received parameter values and actual measurement values to estimate the position of the mobile terminal, wherein the means for utilizing the received parameters and actual measurements to estimate the position of the mobile terminal further comprises means for filtering, with a Kalman filter, joint probability distribution values determined based at least in part on the received parameters and the actual measurements.

Implementations of such a mobile terminal may include one or more of the following features. The means for receiving the expected measurement map includes receiving a set of expected measurement values associated with one of the plurality of communication devices and a plurality of hypothesis locations. The means for receiving the expected measurement map includes means for receiving a set of expected measurement values associated with the plurality of communication devices and a hypothesis location.

An example device includes: a processor; a transceiver operable to send and receive wireless signals, where the processor is coupled to receive data from the transceiver; and a non-transitory memory having stored thereon instructions for configuring the processor to: receive an expected measurement map indicative of an expected measurement values of a parameter by the mobile terminal; receive parameters values of a matrix corresponding to the expected measurement map; capture, by the mobile terminal, actual measurement values of the parameter for a plurality of communication devices; and utilize the received parameter values and actual measurement values to estimate the position of the mobile terminal, wherein the processor is further configured to filter, with a Kalman filter, joint probability distribution values determined based at least in part on the received parameters and the actual measurements.

Implementations of such a device may include one or more of the following features. The instructions for configuring the processor to receive the expected measurement map include instructions for configuring the processor to receive a set of expected measurement values associated with one of the plurality of communication devices and a plurality of hypothesis locations. The instructions for configuring the processor to receive the expected measurement map comprise instructions for configuring the processor to receive a set of expected measurement values associated with the plurality of communication devices and a hypothesis location.

An example non-transitory computer-readable medium, having stored thereon computer-readable instructions for estimating a position of the mobile terminal, includes instructions configured to cause a computer to: receive an expected measurement map indicative of an expected measurement values of a parameter by the mobile terminal; receive parameters values of a matrix corresponding to the expected measurement map; capture, by the mobile terminal, actual measurement values of the parameter for a plurality of communication devices; and utilize the received parameter values and actual measurement values to estimate the position of the mobile terminal, wherein the instructions configured to cause the computer to utilize the received parameter values and the actual measurement values to estimate the position of the mobile further comprise instructions configured to cause the computer to terminal filter, with a Kalman filter, joint probability distribution values determined based at least in part on the received parameters and the actual measurements.

Implementations of such a storage medium may include one or more of the following features. The instructions configured to cause the computer to receive the expected measurement map comprise instructions to cause the computer to receive a set of expected measurement values associated with one of the plurality of communication devices and a plurality of hypothesis locations. The instructions configured to cause the computer to receive the expected measurement map comprise instructions to cause the computer to receive a set of expected measurement values associated with the plurality of communication devices and a hypothesis location.

An example method in a mobile terminal for estimating a position of the mobile terminal includes: receiving an expected measurement map indicative of an expected measurement of a parameter by the mobile terminal; receiving parameters of a matrix corresponding to the expected measurement map; capturing, by the mobile terminal, actual measurements of the parameter for a plurality of communication devices; and utilizing the received parameters and actual measurements to estimate the position of the mobile terminal, where each of the actual measurements and the expected measurement map comprise values indicative of a delay in a communication path between the mobile terminal and one or more of the plurality of communication devices.

Implementations of such a method may include one or more of the following features. Receiving the expected measurement map includes receiving a set of expected measurement values associated with one of the plurality of communication devices and a plurality of hypothesis locations. Receiving the expected measurement map includes receiving a set of expected measurement values associated with a plurality of the plurality of communication devices and a hypothesis location. The expected measurement map is associated with the plurality of communication devices and a plurality of hypothesis locations, the method further including: computing a respective interim vector from the actual measurements and the expected measurement map for each hypothesis location; computing joint probability distribution values as an exponential of a matrix product using the interim vector and the matrix to produce a joint probability distribution value; and filtering the joint probability distribution value to estimate the position of the mobile terminal. The parameters of the matrix include a covariance matrix. The parameters of the matrix include an inverse of a covariance matrix. The expected measurement map includes values indicative of expected received signal strength by the mobile terminal. The interim vector includes a difference between the actual measurements and corresponding expected measurements. Computing the interim vector includes removing an unknown variable. The removing of the unknown variable includes removing an antenna gain of the mobile terminal. The removing of the unknown variable includes removing a fixed processing delay of one or more of the plurality of communication devices. The method is implemented in a server in communication with the mobile terminal, the method further including receiving, from the mobile terminal, captured measurements, from the position of the mobile terminal, for the plurality of communication devices.

An example mobile terminal for estimating a position of the mobile terminal includes: a matrix reception unit to receive parameters of a matrix; an expected measurement map reception unit to receive an expected measurement map indicative of an expected measurement of a parameter by the mobile terminal; a measurement capture unit to capture measurements from the position of the mobile terminal, from a plurality of communication devices; and a computation unit coupled to the matrix reception unit and the measurement capture unit, and to use the received parameters and actual measurements to estimate the position of the mobile terminal, where each of the actual measurements and the expected measurement map comprise values indicative of a delay in a communication path between the mobile terminal and one or more of the plurality of communication devices.

Implementations of such a mobile terminal may include one or more of the following features. The mobile terminal further includes a joint probability distribution computation unit to use compute an interim vector to compute joint probability distribution values as an exponential of a matrix product using the interim vector and the matrix. The parameters of the matrix include a covariance matrix. The parameters of the matrix include an inverse of a covariance matrix. The mobile terminal further includes a filter coupled to the joint probability distribution computation unit and for filtering the joint probability distribution values to estimate the position of the mobile terminal. Computing the interim vector includes removing an unknown variable. The removing of the unknown variable includes removing an antenna gain of the mobile terminal. The removing of the unknown variable includes removing a fixed processing delay of one or more of the plurality of communication devices.

An example mobile terminal for estimating a position of the mobile terminal includes: means for receiving an expected measurement map indicative of an expected measurement of a parameter by the mobile terminal; means for receiving parameters of a matrix corresponding to the expected measurement map; means for capturing, by the mobile terminal, actual measurements of the parameter for a plurality of communication devices; and means for estimating the position of the mobile terminal using the received parameters and actual measurements, where each of the actual measurements and the expected measurement map comprise values indicative of a delay in a communication path between the mobile terminal and one or more of the plurality of communication devices.

Implementations of such a mobile terminal may include one or more of the following features. The means for estimating includes means for removing an unknown variable. The mobile terminal further includes means for computing an interim vector from the expected measurement map and the actual measurements, for each of a plurality of hypothesis locations. The means for estimating includes means for removing an antenna gain of the mobile terminal.

An example device includes: a processor; a transceiver operable to send and receive wireless signals, where the processor is coupled to receive data from the transceiver; and a non-transitory memory having stored thereon instructions for configuring the processor for: receiving an expected measurement map indicative of an expected measurement of a parameter by a mobile terminal; receiving parameters of a matrix corresponding to the expected measurement map; capturing actual measurements of the parameter for a plurality of communication devices; and utilizing the received parameters and actual measurements to estimate a position of the mobile terminal, where each of the actual measurements and the expected measurement map include values indicative of a delay in a communication path between the mobile terminal and one or more of the plurality of communication devices.

Implementations of such a device may include one or more of the following features. The expected measurement map includes, for each of a plurality of hypothesis locations (Loc (i,j)), a set of expected measurement values ($\vec{\mu}_{Loc(i,j)}$) containing expected measurements for the parameter, each of the expected measurements corresponding to a respective communication device of the plurality of communication devices. The instructions stored on the non-transitory memory further include instructions to: capture measurements ($\vec{\mu}_{AT}$), from the position of the mobile terminal, for each of the plurality of communication devices; and computing, for a plurality of hypothesis locations, an interim vector ($\vec{Y}_{i,j}$) from the actual measurements and the expected measurement map, and computing a joint probability distribution value ($P_{i,j}$) as an exponential of a matrix product of and $\vec{Y}_{i,j}$ and $R_{nn}$, and filtering the joint probability distribution value to estimate the position of the mobile terminal. The instructions include instructions for removing an unknown antenna gain of the mobile terminal. The instructions include instructions for removing an unknown processing delay of the plurality of communication devices.

An example non-transitory computer-readable storage medium including program code stored thereon includes program code for: receiving an expected measurement map indicative of an expected measurement of a parameter by a mobile terminal; receiving parameters of a matrix corresponding to the expected measurement map; capturing, by the mobile terminal, actual measurements of the parameter for a plurality of communication devices; and utilizing the received parameters and actual measurements to estimate a position of the mobile terminal, where each of the actual measurements and the expected measurement map include values indicative of a delay in a communication path between the mobile terminal and one or more of the plurality of communication devices.

Implementations of such a storage medium may include one or more of the following features. The storage medium further includes program code for Kalman filtering joint probability distribution values derived for the received parameters and the actual measurements.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments will be described, by way of example only, with reference to the drawings.

FIG. 3 illustrates an example implementation of an interim vector computation unit in a positioning estimation (PE) engine.

FIG. 4 illustrates another example implementation of an interim vector computation unit in a positioning estimation (PE) engine.

FIGS. 5 through 16 show example details for captured measurements ($\vec{\mu}_{AT}$) and interim vectors ($Y_{i,j}$) with and without an explicitly recited unknown parameter.

DETAILED DESCRIPTION

Figure 1:
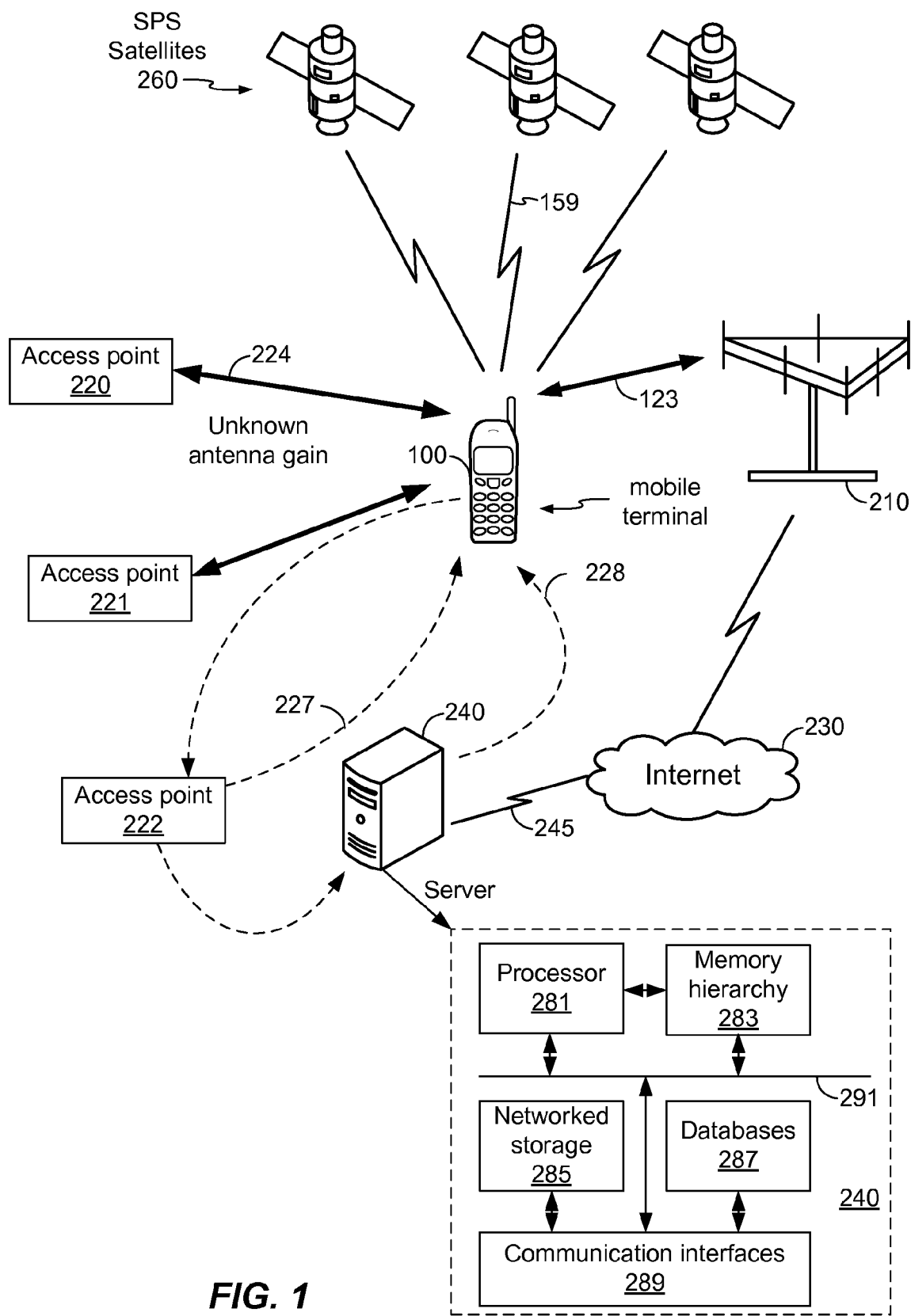
FIG. 1 shows a mobile terminal wirelessly communicating with a plurality of access points and a server in a context in which implementations of the disclosure can be practiced.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a mobile terminal (MT), sometimes referred to as a mobile device, a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term mobile terminal is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, the term mobile terminal is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a mobile terminal.

Comparing signal strength measurements for different access points, relative to an expected value for such measurements is a way to estimate position. To employ such an approach, expected values for such measurements would need to be available for positions at which mobile terminals would be. However, in the initial stages of an indoor positioning deployment, such information may not be available. For example, crowd sourcing may be a way to gather such information, over time, however, such information is not necessarily available. For example, crowd-sourcing servers may not have been deployed yet. Alternately, such information may not be reliable if very few mobile devices have deployed a particular indoor positioning and reporting system. In addition, some information may vary in a manner that cannot be crowd sourced and therefore is initially unknown. For example, antenna gain may vary depending on the orientation of the mobile terminal. This information that may not be available includes: (1) antenna gain of the mobile terminal; and/or (2) processing delays at the mobile terminal.

FIG. 1 shows a mobile terminal (MT 100) wirelessly communicating with a plurality of access points (APs 220-222). The term "access point" is used for simplicity, but refers to communication devices, more generally, one example of which include access points in wireless local area networks, such as IEEE 802 series compliant networks. For example, devices that use Bluetooth can be communication devices according to the disclosure. As such, the usage of the term access point is not exclusive of other kinds of communication networks. MT 100 may also communicate with a server 240, for example, through one or any of the access points. A mobile terminal may use various measurements in estimating its own position. For example, a mobile terminal may use both transmitted and received signals (e.g., capturing RTT measurements (round trip delay measurements)) or may use only received signals (e.g., capturing RSSI measurements (received signal strength indication measurements)). SPS satellites 260 provide SPS signals 159 that can be used by MT 100 and used in position determination. Sometimes, MT 100 may be in a position or in a circumstance where SPS signals 159 cannot be received.

These measurements incorporate an unknown parameter. For example, RTT measurements include: (1) a transmission time from the mobile terminal to an access point; (2) a processing delay within the access point; and (3) a return transmission time from the access point to the mobile terminal. The transmission times (1) and (3) may be assumed to be equal and dependent on distance and speed of propagation of signals between the access point and the mobile terminal. The processing delay within the access point, however, is independent of distance and unknown but assumed constant. Such assumptions may be relaxed, in that actual measurements of processing delay may be undertaken or gathered.

Similarly, the RSSI measurements include: (1) a power gain from a transmit antenna at the access point; (2) a path loss from the access point to the mobile terminal; and (3) a power gain from a receive antenna at the mobile terminal. In this case, the path loss from the access point to the mobile terminal represents the distance between the access point and mobile terminal. The two antenna power gains, however, are independent of distance and unknown but also constant.

Some example embodiments consider the unknown quantity (e.g., processing delay or antenna gain) to remain constant within a family of access points. For example, the processing delay is most likely equal within a family of access points where a family of access points includes access points of the same model and having the same software and chip sets. The antenna gains may also be considered equivalent within a family of access points. That is, an antenna gain between any two access points in the family may be assumed to be equal.

The following disclosure concerns example approaches to position estimation. In these approaches, a map of expected measurements relating to one or more conditions is assembled (or is available, if already assembled). The map of expected measurements contains values for the conditions that are associated with different positions within an area to which the map pertains. For example, for each location of a plurality of locations, the expected measurement map may contain a set of signal strength values, a set of round trip delay values, or both. A mobile terminal, being at a specific, but unknown, location within the area obtains actual measurements for one or more of these conditions.

Using differences between the expected and measured values for a condition, and information concerning how such values (or such differences) vary with changes in position, joint probability information can be determined, which can be filtered and used to estimate a position. Here, joint probability refers to a probability that multiple specified events will all occur. More concretely in the present disclosure, and as a simplified example, a joint probability of differences between actual measurements and expected measurements, for each of a plurality of hypothesis locations, and processed using covariance information is probative of an actual location of a mobile terminal.

FIG. 1 also depicts an example implementation of server 240 including a processor 281, which is coupled with a memory hierarchy 283 (e.g., on chip and off chip caches and RAM), and networked storage 285. Networked storage 285 can host databases 287. Communication interfaces 289 serve to allow communications with networked devices and across networks, such as communications 245 over internet 230. Depicted components can communicate over high speed communication functionality 291, which can include point to point links between processor 281, a memory bus, a fabric, an embedded switch, PCI Express connections and other generally short distance and high bandwidth data connections. As such server 240 would be understood to refer to server functionality, as may be provided by any of a variety of components and supporting infrastructure, rather than to a single physically distinct server.

Figure 2:
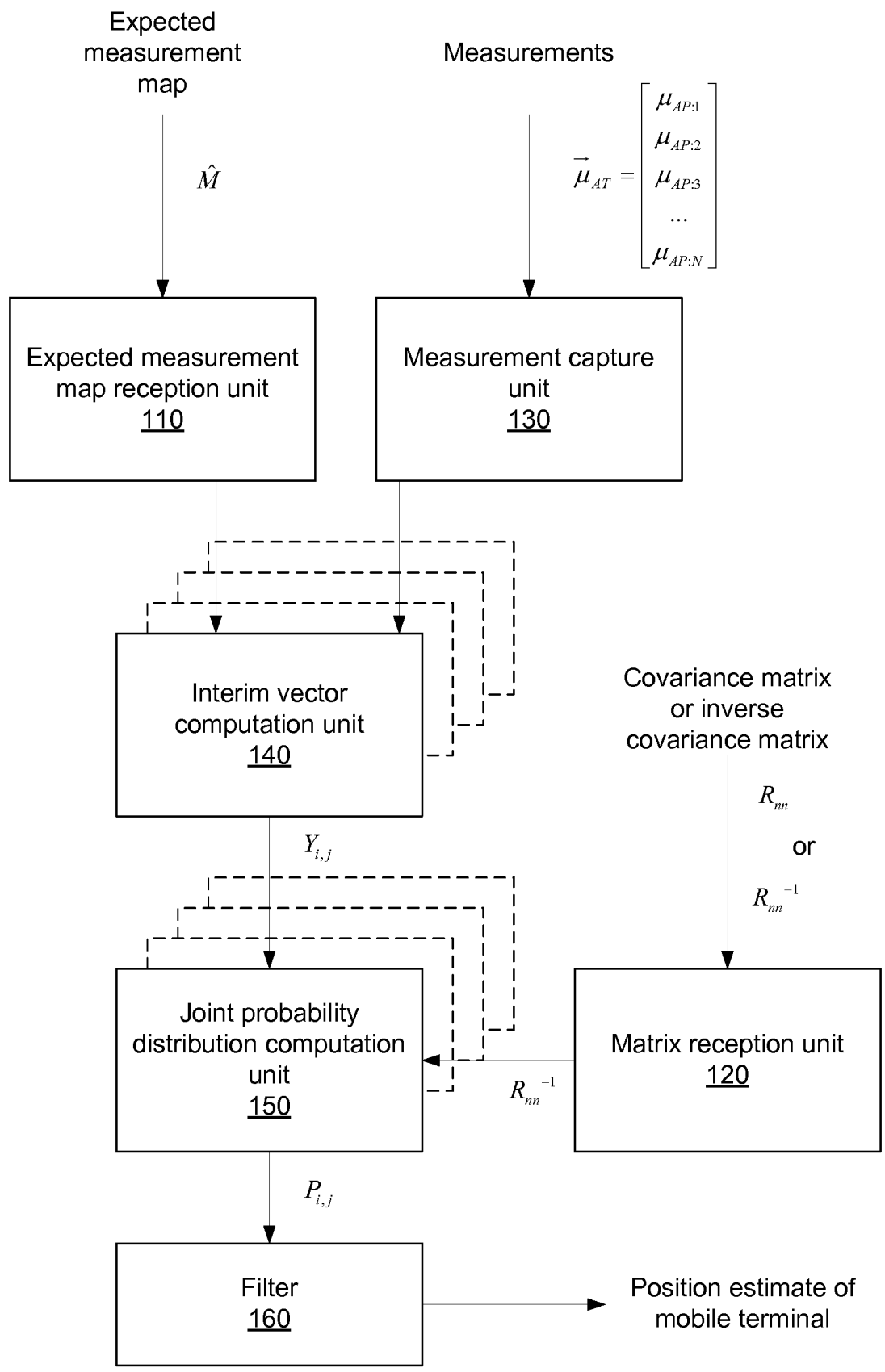
FIG. 2 illustrates aspects of an example positioning estimation (PE) engine.

FIG. 2 illustrates example aspects of a positioning estimation (PE) engine. The depicted PE engine performs an exemplary process to determine a position estimate of a mobile terminal by filtering joint probabilities computed from an expected measurement map ($\hat{M}$) and a measurement vector ($\vec{\mu}_{AT}$) captured by the mobile terminal. Here, the term joint probability includes a measure of how probable a given measurement value or values are, or other figure of merit derived from the data and measurements described here. For example, expected measurements for a plurality of radios, under a condition or assumption of a radio being at a hypothesis location, can be used as a data source for a joint probability calculation. Here, the term vector refers to a set of ordered values. The ordering typically would be implicit, in that the ordering would relate to what component each value pertains. For example, a vector of signal strength measurements may be an ordered set of signal strength measurements, where the ordering is determined by an ordering of communication devices to which the signal strength measurements pertain (one or more radios being a part of such wireless communication devices).

Figure 17:
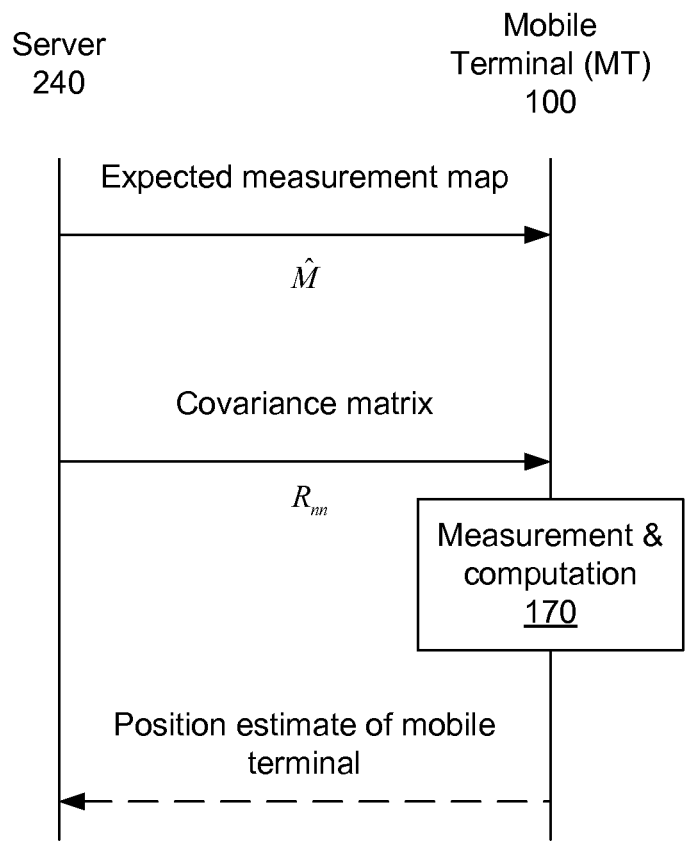
FIGS. 17 through 20 illustrate examples aspects of communication between a server and a mobile terminal.
Figure 18:
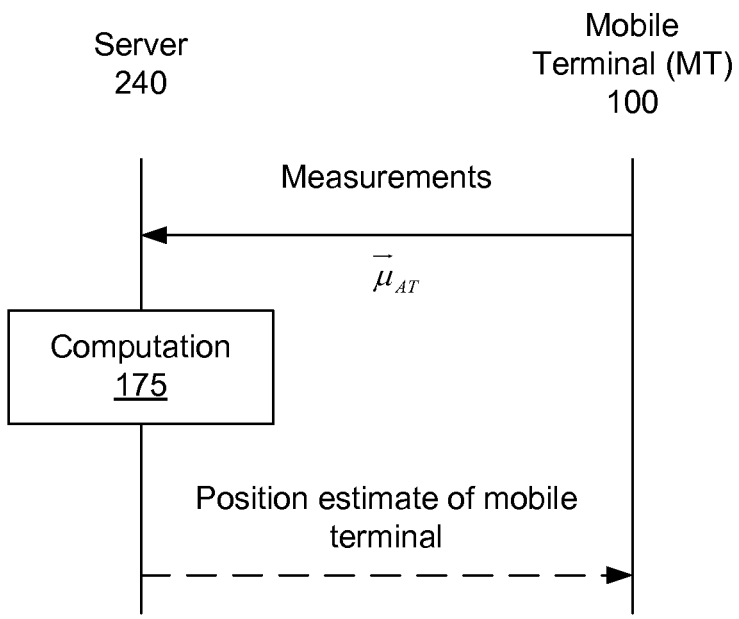
Figure 19:
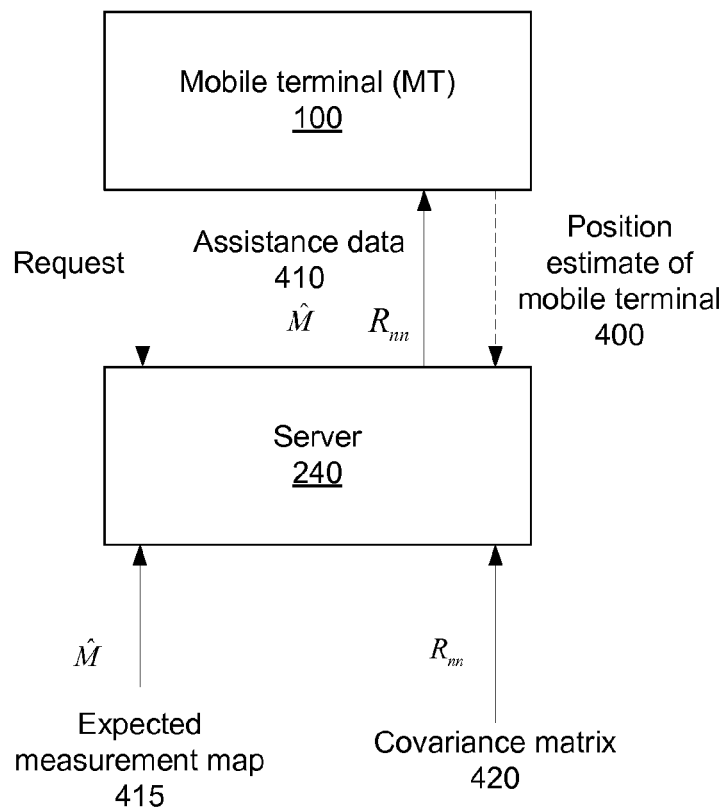
Figure 20:
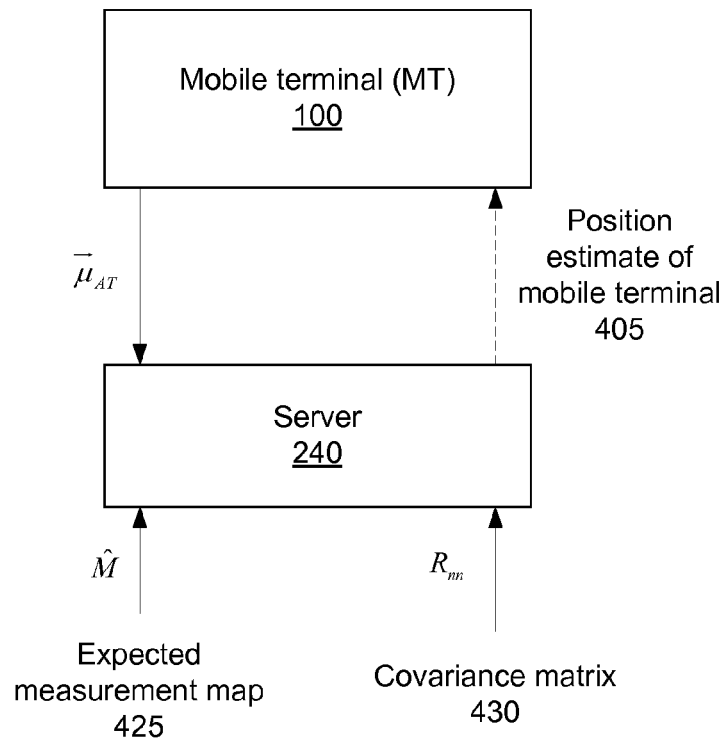

An interim vector (Y) is computed based on the expected measurement map ($\hat{M}$) and the captured measurement vector ($\vec{\mu}_{AT}$). The interim vector (Y) may incorporate an unknown value and be of length N (as shown in FIG. 3) or may remove an unknown value (e.g., AP processing delay or MT antenna gain) and be of length N−1 (as shown in FIG. 4), where N is a number of access points (APs) that the mobile terminal (MT) has taken measurements. For example, unknown antenna gain 224 of access point (AP 220) or of mobile terminal 100 (FIG. 1) is an unknown that can be removed. The measurements may be RSSI (as shown starting at FIG. 5) and/or RTT measurements (as shown starting at FIG. 11) or the like. As an example of RTT, a sequence of communication originating from mobile terminal to access point 222, and directly back 227, or through server 240 (via 228) may be used as an indication of round trip time. A round trip time may be calculated using lower level radio communications, and attempting to avoid delays that travel through applications or servers. Round trip time, as used here, stands for the more general proposition of determining a communication delay time, where one approach is to mark an outgoing communication time and wait for a responsive signal. However, in a synchronous system, a packet could contain time mark information as to transmission time, and a reception time can be used to calculate delay. In such a case, the round trip is satisfied by the known transmission time. The computation may occur within the mobile terminal (MT) (as shown in FIGS. 17 and 19) and/or within a server (as shown in FIGS. 18 and 20).

FIG. 2 shows an expected measurement map reception unit 110, a matrix reception unit 120, a measurement capture unit 130, an interim vector computation unit 140, a joint probability distribution computation unit 150, and a filter 160. The expected measurement map reception unit 110 receives an expected measurement map ($\hat{M}$). The expected measurement map reception unit 110 acts as a means for receiving an expected measurement map ($\hat{M}$) indicative of an expected measurement of a parameter by the mobile terminal. The expected measurement map ($\hat{M}$) includes values that are expected to be predictive or otherwise coincide with measurements taken by MT 100, when at any of a plurality of hypothesis locations (Loc(i,j)). For each hypothesis location, $\hat{M}$ includes an expected measurement vector ($\hat{\mu}_{Loc(i,j)}$).

Each $\vec{\mu}_{Loc(i,j)}$ may include a value for each access point (AP:1 AP:2 ... AP:N) for when such data is available (e.g., for each access point in communication with the mobile terminal). As such, $\hat{M}$ includes a number of expected measurement vectors corresponding to different locations within a coverage area of the measurement map, and each measurement vector includes a number of scalar values.

Each value in a particular $\vec{\mu}_{Loc(i,j)}$ corresponds to a particular hypothesis location, and represents measurements that a receiver in the mobile terminal would expect to observe or measure, if the mobile terminal were in that hypothesis location (Loc(i,j)). By particular example, the mobile terminal would observe a respective signal strength for each access point when that mobile terminal is at a particular Loc(i,j) and the expected measurements would attempt to track what mobile terminals actually observe in that location. In sum, the expected measurement vector ($\vec{\mu}_{Loc(i,j)}$) includes expected values for scalar measurements ($\hat{\mu}_{AP:k}$ for k=1 to N) that can be taken by a mobile terminal, and which correspond to the plurality of access points ($\vec{\mu}_{Loc(i,j)} = [\hat{\mu}_{AP:1} \; \hat{\mu}_{AP:2} \; \hat{\mu}_{AP:3} \; \ldots \; \hat{\mu}_{AP:N}]^T$).

The expected measurement map ($\hat{M}$) may represent a plurality of expected measurement vectors ($\vec{M}_{Loc(i,j)}$) for a corresponding plurality of locations (Loc(i,j)) where i and j span the location space, and a plurality of access points. On the other hand, a measurement vector ($\vec{\mu}_{AT}$) represents actual measurements captured by a mobile terminal (MT 100) at a position. In one situation, the position is not known, and is to be estimated. However, in a situation where the MT position is known, these $\vec{\mu}_{AT}$ may be used to construct or revise portions of $\hat{M}$.

A measurement capture unit 130 receives measurements captured by a mobile terminal at a particular location. The measurement vector ($\vec{\mu}_{AT}$) includes a scalar measurement taken by the mobile terminal, at the particular location, of signals from each of a plurality of access points, $\vec{\mu}_{AT} = [\mu_{AP:1} \; \mu_{AP:2} \; \mu_{AP:3} \; \ldots \; \mu_{AP:N}]^T$. For example, the measurements ($\vec{\mu}_{AT}$) and the expected measurement vector ($\vec{\mu}_{Loc(i,j)}$) comprise Received Signal Strength Indication (RSSI) values. The measurements ($\vec{\mu}_{AT}$) and the expected measurement vector ($\vec{\mu}_{Loc(i,j)}$) may comprise Round Trip Time (RTT) values additionally or alternatively. The measurement capture unit 130 acts as a means for means for capturing, by the mobile terminal, actual measurements of the parameter for a plurality of communication devices.

The expected measurement map reception unit 110 and the measurement capture unit 130 may contain memory to collect and hold the expected measurement map ($\hat{M}$) and the measurement vector ($\vec{\mu}_{AT}$). The expected measurement map reception unit 110 presents the expected measurement map ($\hat{M}$) and the measurement capture unit 130 presents the measurement vector ($\vec{\mu}_{AT}$) to an interim vector computation unit 140. The interim vector computation unit 140 computes an interim vector ($Y_{hd\,i,j}$) from the expected measurement map ($\hat{M}$) and the measurement vector ($\vec{\mu}_{AT}$). The interim vector computation unit 140 acts as a means for generating an interim vector ($Y_{i,j}$) from the expected measurement map ($\hat{M}$) and measurement vector ($\vec{\mu}_{AT}$). The interim vector computation unit 140 is further described with reference to FIG. 3.

The interim vector ($Y_{i,j}$) generated by the interim vector computation unit 140 is presented to a joint probability distribution computation unit 150. In some embodiments, a matrix reception unit 120 receives the covariance matrix ($R_{nn}$) and provides an inverse covariance matrix ($R_{nn}^{-1}$). In other embodiments, the matrix reception unit 120 receives an inverse covariance matrix ($R_{nn}^{-1}$) and provides the inverse covariance matrix ($R_{nn}^{-1}$). The inverse covariance matrix ($R_{nn}^{-1}$) is provided by the matrix reception unit 120 as a second input value to the joint probability distribution computation unit 150. The matrix reception unit 120 acts as a means for receiving the covariance matrix ($R_{nn}$) or the inverse covariance matrix ($R_{nn}^{-1}$) from a server, such as server 240 described below. Also, the matrix reception unit 120 acts as a means for receiving parameters of a matrix corresponding to the expected measurement map ($\hat{M}$). The joint probability distribution computation unit 150 and/or the filter 160 acts as a means for means for estimating the position of the mobile terminal using the received parameters and actual measurements (e.g., measurement vector $\vec{\mu}_{AT}$).

The covariance matrix ($R_{nn}$) may be provided by a server 240 to the mobile terminal 100 either in non-inverted form or inverted form. The matrix reception unit 120 may contain memory to collect and hold the covariance matrix ($R_{nn}$) or the inverse covariance matrix ($R_{nn}^{-1}$). The covariance matrix $R_{nn}$ may be represented in any appropriate form, and as such, communicating such matrix can be described as communicating parameters representative of the information in the matrix (i.e., a particular or explicit form of the information is not required). A means for calculating joint probability distributions according to the disclosure include a processor programmed to perform the described process, such as a general purpose processor or a DSP.

The covariance matrix ($R_{nn}$) represents a covariance of the measured noise received by the mobile terminal. The covariance matrix ($R_{nn}$) may be communicated or instead the inverse covariance matrix ($R_{nn}^{-1}$) may be communicated, computed and/or stored. In cases where the covariance matrix ($R_{nn}$) is communicated from a server (e.g., server 240 described below with reference to FIGS. 17 and 18) to the mobile terminal (e.g., MT 100), the mobile terminal computes the inverse covariance matrix ($R_{nn}^{-1}$). In cases where the inverse covariance matrix ($R_{nn}^{-1}$) is communicated rather than the non-inverse covariance matrix ($R_{nn}$), the mobile terminal may save processing power by not computing an inverse of a matrix and instead collecting the parameters into matrix form.

The covariance matrix ($R_{nn}$) may be communicated from server 240 to the mobile terminal, considered a constant or learned by the mobile terminal. The covariance matrix ($R_{nn}$) may be formed based on crowd sourcing noise estimates from several mobile terminals. The noise may be assumed to be constant everywhere or may be assumed to be an inverse function of respective distances between the mobile terminal and the access points, among the different locations. As such, a number of covariance matrices may be formed for use in a particular area, and these covariance matrices may be refined over time, based on measurements obtained from mobile terminals, refined models, simulations, and other approaches. A particular area may be subdivided into more granular covariance matrices, as information becomes more detailed within that area. In some cases, the noise may be assumed to be zero-mean, Gaussian noise with a variance of $\sigma_i^2$ (where i indexes a particular access point, at a particular location.)

The joint probability distribution computation unit 150 computes a joint probability distribution value ($P_{i,j}$) from the interim vector ($Y_{i,j}$) and the inverse covariance matrix ($R_{nn}^{-1}$). For example, the joint probability distribution value ($P_{i,j}$) may be an exponential of a matrix product based on the interim vector ($\vec{Y}_{i,j}$) and the covariance matrix ($R_{nn}$). In some cases, the exponential of the matrix product may be computed as a joint probability distribution value ($P_{i,j}$) equal to $\exp^{(\alpha)}$, where the exponent $\alpha$ is $-(\vec{Y}_{i,j}^T) R_{nn}^{-}(\vec{Y}_{i,j})$. Alternatively, if the covariance matrix ($R_{nn}$) is a constant, the exponential of the matrix product may be computed as a joint probability distribution value ($P_{i,j}$) equal to $\exp^{(\beta)}$, where the exponent $\beta$ is $-(\vec{Y}_{i,j}^T)(\vec{Y}_{i,j})$.

A filter 160 may be applied to filter the joint probability distribution values) to a final position estimate of the mobile terminal. For example, filter 160 may include a positioning estimation (PE) engine, a particle filter, a Kalman filter, or the like. The filter 160 accepts the joint probability distribution values ($P_{i,j}$) and estimates the position of the mobile terminal. Filter 160 provides a means for filtering joint probability distribution values. The filter 160 acts as a means for filtering the joint probability distribution values ($P_{i,j}$) to produce a position estimate of the mobile terminal.

Each of these units shown in FIG. 2 (namely, the expected measurement map reception unit 110, the matrix reception unit 120, the measurement capture unit 130, the interim vector computation unit 140, joint probability distribution computation unit 150, and the filter 160) may be modules stored within a software program on non-transitory memory and running on a processor, such as a general purpose computer or a DSP.

FIG. 3 illustrates aspects of an implementation of an interim vector computation unit 140 in a positioning estimation (PE) engine. The expected measurement map ($\hat{M}$) may be represented by a matrix of expected measurement vectors ($\vec{\mu}_{Loc(i,j)}$) indexed by i and j such that:

$$\hat{M} = \begin{bmatrix} \vec{\mu}_{Loc(1,1)} & \vec{\mu}_{Loc(2,1)} & \cdots & \vec{\mu}_{Loc(x,1)} \\ \vec{\mu}_{Loc(1,2)} & \vec{\mu}_{Loc(2,2)} & \cdots & \vec{\mu}_{Loc(x,2)} \\ \cdots & \cdots & \vec{\mu}_{Loc(i,j)} & \cdots \\ \vec{\mu}_{Loc(1,y)} & \vec{\mu}_{Loc(2,y)} & \cdots & \vec{\mu}_{Loc(x,y)} \end{bmatrix}.$$

In the above matrix, each expected measurement vector ($\vec{\mu}_{Loc(i,j)}$) is represented by a sequence of scalar values $\vec{\mu}_{Loc(i,j)} = [\hat{\mu}_{AP:1} \; \hat{\mu}_{AP:2} \; \hat{\mu}_{AP:3} \ldots \hat{\mu}_{AP:N}]^T$ and the scalar $\hat{\mu}_{AP:k}$ is an expected or probable measurement of a condition for a particular hypothetical location Loc(i,j) and a particular $k^{th}$ Access Point (AP:k).

The mobile terminal captures and saves measurements ($\vec{\mu}_{AT}$) taken from its current location (measurements corresponding to each of the access points, which may be represented conveniently in vector form as $\vec{\mu}_{AT} = [\mu_{AP:1} \; \mu_{AP:2} \; \mu_{AP:3} \ldots \mu_{AP:N}]^T$. A means for capturing measurements includes, for example, a functional unit that reads or otherwise accesses a measured value for a parameter or condition (such as signal strength or round trip time), and stores such data identifying the access point to which such data pertains.

The interim vector computation unit 140 determines which one of the expected measurement vectors ($\vec{\mu}_{Loc(i,j)}$) in the expected measurement map ($\hat{M}$) is closest to the saved measurement vector ($\vec{\mu}_{AT}$). For example, the closest expected measurement vector ($\vec{\mu}_{min} = \vec{\mu}_{Loc(i,j)}$, for a selected hypothetical location i,j) may be determined as the hypothesis location (Loc(i,j)) which provides a minimum value of the absolute difference between the actual and expected measurements $$\|\vec{\mu}_{AT} - \vec{\mu}_{Loc(i,j)}\|.$$

The interim vector ($Y_{i,j}$) is set as the difference between the saved measurement vector ($\vec{\mu}_{AT}$) and the closest expected measurement vector ($\vec{\mu}_{min}$) and may be represented as $Y_{i,j} = \vec{\mu}_{AT} - \vec{\mu}_{min}$ or as:

$$Y_{i,j} = \begin{bmatrix} \mu_{AP:1} - \hat{\mu}_{AP:1} \\ \mu_{AP:2} - \hat{\mu}_{AP:2} \\ \mu_{AP:3} - \hat{\mu}_{AP:3} \\ \cdots \\ \mu_{AP:N} - \hat{\mu}_{AP:N} \end{bmatrix}.$$

The interim vector ($Y_{i,j}$) may include an inherent unknown hidden component in the variables described above, or the interim vector computation unit 140 may actively separate this unknown, as described below.

FIG. 4 illustrates another implementation of an interim vector computation unit in a positioning estimation (PE) engine. The unknown is estimated as $\hat{\mu}_{AP:1}$ for a first access point ($AP_1$). The estimated unknown variable may be different for each access point in a family of access points $(\hat{\mu}_{AP:1}, \hat{\mu}_{AP:2}, \hat{\mu}_{AP:3}, \ldots, \hat{\mu}_{AP:N})$. In this case, the vector row for the first measurement of the first access point is dropped as shown below:

$$Y_{i,j} = \begin{bmatrix} \mu_{AP:2} - \hat{\mu}_{AP:1} - \hat{\mu}_{AP:2} \\ \mu_{AP:3} - \hat{\mu}_{AP:1} - \hat{\mu}_{AP:3} \\ \ldots \\ \mu_{AP:N} - \hat{\mu}_{AP:1} - \hat{\mu}_{AP:N} \end{bmatrix}.$$

FIGS. 5 through 16 show example details for captured measurements ($\vec{\mu}_{AT}$) and interim vectors ($Y_{i,j}$) with and without explicitly reciting this unknown parameter.

FIG. 5 shows captured measurements ($\vec{\mu}_{AT}$) RSSI (received signal strength indication) values 305. These values are received at the mobile terminal from signals transmitted by the access points. The captured measurements ($\vec{\mu}_{AT}$) do not explicitly pull out an unknown, as shown below:

$$\vec{\mu}_{AT} = \begin{bmatrix} \mu_{AP:1} \\ \mu_{AP:2} \\ \mu_{AP:3} \\ \ldots \\ \mu_{AP:N} \end{bmatrix} = \begin{bmatrix} RSSI_{AP:1} \\ RSSI_{AP:2} \\ RSSI_{AP:3} \\ \ldots \\ RSSI_{AP:N} \end{bmatrix}.$$

FIG. 6 shows the minimum vector ($\vec{\mu}_{min}$) 310, computed based on which one of the expected measurement vectors ($\vec{\mu}_{Loc(i,j)}$) from the expected measurement map ($\hat{M}$) is closest to the captured measurements ($\vec{\mu}_{AT}$) RSSI values, as shown below:

$$\vec{\mu}_{min} = \begin{bmatrix} \hat{\mu}_{AP:1} \\ \hat{\mu}_{AP:2} \\ \hat{\mu}_{AP:3} \\ \ldots \\ \hat{\mu}_{AP:N} \end{bmatrix} = \begin{bmatrix} RSSI\_est_{AP:1} \\ RSSI\_est_{AP:2} \\ RSSI\_est_{AP:3} \\ \ldots \\ RSSI\_est_{AP:N} \end{bmatrix}.$$

FIG. 7 shows the interim vector ($Y_{i,j}$) 315 computed based on the captured measurements ($\vec{\mu}_{AT}$) RSSI values and the minimum vector ($\vec{\mu}_{min}$). Again, the interim vector ($Y_{i,j}$) does not explicitly pull out an unknown, as shown below:

$$Y_{i,j} = \vec{\mu}_{AT} - \vec{\mu}_{min} = \begin{bmatrix} \mu_{AP:1} - \hat{\mu}_{AP:1} \\ \mu_{AP:2} - \hat{\mu}_{AP:2} \\ \mu_{AP:3} - \hat{\mu}_{AP:3} \\ \ldots \\ \mu_{AP:N} - \hat{\mu}_{AP:N} \end{bmatrix} = \begin{bmatrix} \mu_{AP:1} - RSSI\_est_{AP:1} \\ \mu_{AP:2} - RSSI\_est_{AP:2} \\ \mu_{AP:3} - RSSI\_est_{AP:3} \\ \ldots \\ \mu_{AP:N} - RSSI\_est_{AP:N} \end{bmatrix}.$$

FIG. 8 shows captured measurements ($\vec{\mu}_{AT}$) RSSI values 320. Again, these values are determined at the mobile terminal based on signals transmitted by the access points. Here, the captured measurements ($\vec{\mu}_{AT}$) are modified to explicitly pull out an unknown RSSI value for the first access point, as shown below:

$$\vec{\mu}_{AT} = \begin{bmatrix} \mu_{AP:2} - \hat{\mu}_{AP:1} \\ \mu_{AP:3} - \hat{\mu}_{AP:1} \\ \ldots \\ \mu_{AP:N} - \hat{\mu}_{AP:1} \end{bmatrix} = \begin{bmatrix} RSSI_{AP:2} - RSSI_{AP:1} \\ RSSI_{AP:3} - RSSI_{AP:1} \\ \ldots \\ RSSI_{AP:N} - RSSI_{AP:1} \end{bmatrix}.$$

FIG. 9 shows the minimum vector ($\vec{\mu}_{min}$) 325, computed based on which one of the expected measurement vectors ($\vec{\mu}_{Loc(i,j)}$) from the expected measurement map ($\hat{M}$) is closest to the captured measurements ($\vec{\mu}_{AT}$) RSSI values, as shown below:

$$\vec{\mu}_{min} = \begin{bmatrix} \hat{\mu}_{AP:2} \\ \hat{\mu}_{AP:3} \\ \ldots \\ \hat{\mu}_{AP:N} \end{bmatrix} = \begin{bmatrix} RSSI\_est_{AP:2} \\ RSSI\_est_{AP:3} \\ \ldots \\ RSSI\_est_{AP:N} \end{bmatrix}.$$

FIG. 10 shows the interim vector ($Y_{i,j}$) 330 computed based on the captured measurements ($\vec{\mu}_{AT}$) RSSI values, the minimum vector ($\vec{\mu}_{min}$) and the unknown RSSI value from the first access point, as shown below:

$$Y_{i,j} = \vec{\mu}_{AT} - \vec{\mu}_{min} - \hat{\mu}_{AP:1} = \begin{bmatrix} \mu_{AP:2} - \hat{\mu}_{AP:1} - \hat{\mu}_{AP:2} \\ \mu_{AP:3} - \hat{\mu}_{AP:1} - \hat{\mu}_{AP:3} \\ \ldots \\ \mu_{AP:N} - \hat{\mu}_{AP:1} - \hat{\mu}_{AP:N} \end{bmatrix} =$$

$$\begin{bmatrix} RSSI_{AP:2} - RSSI_{AP:1} - RSSI\_est_{AP:2} \\ RSSI_{AP:3} - RSSI_{AP:1} - RSSI\_est_{AP:3} \\ \ldots \\ RSSI_{AP:N} - RSSI_{AP:1} - RSSI\_est_{AP:N} \end{bmatrix}$$

In the examples above, RSSI values were used. In the examples below, RTT values are used.

FIG. 11 shows captured measurements ($\vec{\mu}_{AT}$) RTT (round trip time) values 335. These values are computed at the mobile terminal from signals transmitted between the mobile terminal and the access points. The captured measurements ($\vec{\mu}_{AT}$) do not explicitly pull out an unknown, as shown below:

$$\vec{\mu}_{AT} = \begin{bmatrix} \mu_{AP:1} \\ \mu_{AP:2} \\ \mu_{AP:3} \\ \ldots \\ \mu_{AP:N} \end{bmatrix} = \begin{bmatrix} RTT_{AP:1} \\ RTT_{AP:2} \\ RTT_{AP:3} \\ \ldots \\ RTT_{AP:N} \end{bmatrix}.$$

FIG. 12 shows the minimum vector ($\vec{\mu}_{min}$) 340, computed based on which one of the expected measurement vectors ($\vec{\mu}_{Loc(i,j)}$) from the expected measurement map ($\hat{M}$) is closest to the captured measurements ($\vec{\mu}_{AT}$) RTT values, as shown below:

$$\vec{\mu}_{min} = \begin{bmatrix} \hat{\mu}_{AP:1} \\ \hat{\mu}_{AP:2} \\ \hat{\mu}_{AP:3} \\ \ldots \\ \hat{\mu}_{AP:N} \end{bmatrix} = \begin{bmatrix} RTT\_est_{AP:1} \\ RTT\_est_{AP:2} \\ RTT\_est_{AP:3} \\ \ldots \\ RTT\_est_{AP:N} \end{bmatrix}$$

FIG. 13 shows the interim vector $(Y_{i,j})$ 345 computed based on the captured measurements ($\vec{\mu}_{AT}$) RTT values and the minimum vector ($\vec{\mu}_{min}$). Again, the interim vector $(Y_{i,j})$ does not explicitly pull out an unknown, as shown below:

$$Y_{i,j} = \vec{\mu}_{AT} - \vec{\mu}_{min} = \begin{bmatrix} \mu_{AP:1} - \hat{\mu}_{AP:1} \\ \mu_{AP:2} - \hat{\mu}_{AP:2} \\ \mu_{AP:3} - \hat{\mu}_{AP:3} \\ \ldots \\ \mu_{AP:N} - \hat{\mu}_{AP:N} \end{bmatrix} = \begin{bmatrix} \mu_{AP:1} - RTT\_est_{AP:1} \\ \mu_{AP:2} - RTT\_est_{AP:2} \\ \mu_{AP:3} - RTT\_est_{AP:3} \\ \ldots \\ \mu_{AP:N} - RTT\_est_{AP:N} \end{bmatrix}$$

FIG. 14 shows captured measurements ($\vec{\mu}_{AT}$) RTT (round trip time) values 350. Again, these values are computed at the mobile terminal based on signals transmitted between the mobile terminal and the access points. The captured measurements ($\vec{\mu}_{AT}$) explicitly pull out an unknown RTT value for the first access point, as shown below:

$$\vec{\mu}_{AT} = \begin{bmatrix} \mu_{AP:2} - \hat{\mu}_{AP:1} \\ \mu_{AP:3} - \hat{\mu}_{AP:1} \\ \ldots \\ \mu_{AP:N} - \hat{\mu}_{AP:1} \end{bmatrix} = \begin{bmatrix} RSSI_{AP:2} - RTT_{AP:1} \\ RSSI_{AP:3} - RTT_{AP:1} \\ \ldots \\ RSSI_{AP:N} - RTT_{AP:1} \end{bmatrix}.$$

FIG. 15 shows the minimum vector ($\vec{\mu}_{min}$) 355, computed based on which one of the expected measurement vectors ($\vec{\mu}_{Loc(i,j)}$) from the expected measurement map ($\hat{M}$) is closest to the captured measurements ($\vec{\mu}_{AT}$) RTT values, as shown below:

$$\vec{\mu}_{min} = \begin{bmatrix} \hat{\mu}_{AP:2} \\ \hat{\mu}_{AP:3} \\ \ldots \\ \hat{\mu}_{AP:N} \end{bmatrix} = \begin{bmatrix} RTT\_est_{AP:2} \\ RTT\_est_{AP:3} \\ \ldots \\ RTT\_est_{AP:N} \end{bmatrix}$$

FIG. 16 shows the interim vector $(Y_{i,j})$ 360 computed based on the captured measurements ($\vec{\mu}_{AT}$) RTT values, the minimum vector ($\vec{\mu}_{min}$) and the unknown RTT value from the first access point, as shown below:

$$Y_{i,j} = \vec{\mu}_{AT} - \vec{\mu}_{min} - \hat{\mu}_{AP:1} = \begin{bmatrix} \mu_{AP:2} - \hat{\mu}_{AP:1} - \hat{\mu}_{AP:2} \\ \mu_{AP:3} - \hat{\mu}_{AP:1} - \hat{\mu}_{AP:3} \\ \ldots \\ \mu_{AP:N} - \hat{\mu}_{AP:1} - \hat{\mu}_{AP:N} \end{bmatrix} =$$

$$\begin{bmatrix} RTT_{AP:2} - RTT_{AP:1} - RTT\_est_{AP:2} \\ RTT_{AP:3} - RTT_{AP:1} - RTT\_est_{AP:3} \\ \ldots \\ RTT_{AP:N} - RTT_{AP:1} - RTT\_est_{AP:N} \end{bmatrix}$$

FIGS. 17 through 20 illustrate exemplary aspects of communication between a server and a mobile terminal. In FIG. 17, a server 240 communicates an expected measurement map ($\hat{M}$) to a mobile terminal (MT 100). Optionally, the server 240 also communicates a covariance matrix ($R_{nn}$) (or equivalently, an inverse covariance matrix ($R_{nn}^{-1}$)) to the mobile terminal in the matrix reception unit 120. At 170, the mobile terminal performs the measurements and computation described above with reference to FIG. 2. Specifically, the measurement capture unit 130 measures a measurement vector ($\vec{\mu}_{AT}$) at the mobile terminal. The interim vector computation unit 140 and joint probability distribution computation unit 150 compute the joint probability distribution value ($P_{i,j}$) as an exponential of a matrix product using the interim vector ($\vec{Y}_{i,j}$) and optionally the covariance matrix ($R_{nn}$). For example, the mobile terminal may compute the joint probability distribution value ($P_{i,j}$) as $\exp^{(\alpha)}$, where the exponential $\alpha$ value is $-\vec{Y}_{i,j}^T R_{nn}^{-1} \vec{Y}_{i,j}$. Alternatively, the mobile terminal may compute the joint probability distribution value ($P_{i,j}$) as $\exp^{(\beta)}$, where the exponential value $\beta$ is $-\vec{Y}_{i,j}^T \vec{Y}_{i,j}$, when the covariance matrix ($R_{nn}$) is assumed to be constant.

Finally, the mobile terminal may filter the joint probability distribution values ($P_{i,j}$) in filter 160 to produce a position estimate of the mobile terminal. In some cases, the mobile terminal uses the position estimate but does not communicate the position estimate to the server 240. In other cases, the mobile terminal does not use the position estimate but only communicates the position estimate to the server 240. Yet in other cases, the mobile terminal both uses the position estimate and communicates the position estimate to the server 240.

In FIG. 18, a mobile terminal captures and saves measurements, as a measurement vector ($\vec{\mu}_{AT}$), where the measurements are taken from current location of the mobile terminal Instead of computing the position estimate, the mobile terminal communicates the measurement vector ($\vec{\mu}_{AT}$) to a server 240. At 175, the server 240 in turn performs the functions of FIG. 2. Namely, the server 240 provides an expected measurement map ($\hat{M}$), as described above with the expected measurement map reception unit 110, receives the measurement vector ($\vec{\mu}_{AT}$) from the mobile terminal, computes the interim vector ($\vec{Y}_{i,j}$) from the expected measurement map ($\hat{M}$) and the measurement vector ($\vec{\mu}_{AT}$), computes the joint probability distribution value ($P_{i,j}$) as an exponential of a matrix product using the interim vector ($\vec{Y}_{i,j}$) and optionally the covariance matrix ($R_{nn}$). Finally, the server 240 optionally filters the joint probability distribution values ($P_{i,j}$) and provides a position estimate of the mobile terminal. In some cases, the server 240 uses the position estimate but does not communicate the position estimate to the mobile terminal. In other cases, the server 240 does not use the position estimate but only communicates the position estimate to the mobile terminal. Yet in other cases, the server 240 both uses the position estimate and communicates the position estimate to the mobile terminal.

FIG. 19 shows a mobile terminal (MT 100) determining a position estimate 400 of its position. First, the mobile terminal receives an expected measurement map (M̂) and a covariance matrix ($R_{mn}$) as assistance data 410. The mobile terminal may receive these variables in response to a request or unsolicited from a server 240. Next, the mobile terminal captures the measurement vector ($\vec{\mu}_{AT}$) and computes the joint probability distribution value ($P_{i,j}$) as described above at 170. Finally, the position estimate 400 of the position of the mobile terminal may be used internally to the mobile terminal, communicated to the server 240, or both.

FIG. 20 shows a server 240 determining a position estimate 405 of a mobile terminal (MT 100). First, the mobile terminal captures and sends to the server 240 a measurement vector ($\vec{\mu}_{AT}$). Next, the server 240 receives the measurement vector ($\vec{\mu}_{AT}$) and uses an expected measurement map (M̂) and a covariance matrix ($R_{mn}$) to compute the joint probability distribution value ($P_{i,j}$) as described above at 175. The server 240 may receive the measurement vector ($\vec{\mu}_{AT}$) in response to a request or unsolicited from the mobile terminal Finally, the server 240 may optionally send the position estimate 405 of the mobile terminal to the mobile terminal for use in the mobile terminal and/or use the position estimate within the server 240.

Figure 21:
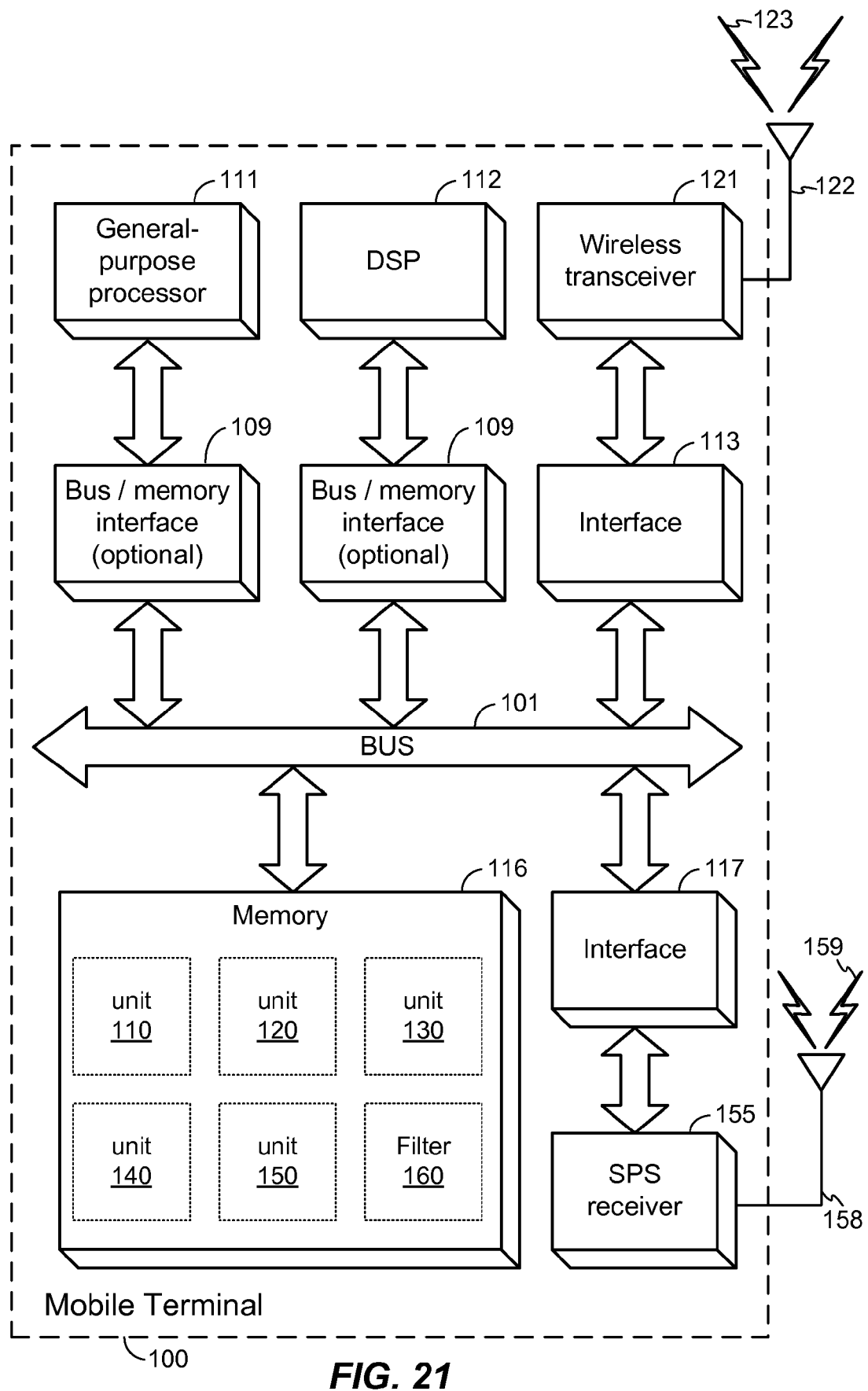
FIG. 21 depicts an example construction of a mobile terminal.

FIG. 21 depicts components of an example mobile terminal 100. Mobile terminal 100 contain a wireless transceiver 121 capable of sending and receiving wireless signals 123 via a wireless antenna 122. The wireless signals 123 can originate from a communication device 210, such as a base station of a cellular telephony or data network. Wireless transceiver 121 can be coupled with bus 101 by a bus interface 113. The bus interface 113 may be implemented as a part of the wireless transceiver 121. Wireless transceiver 121 and wireless antenna 122 may support one or more of a variety of technologies or standard communication protocols and systems, such as WiFi, CDMA, WCDMA, LTE and Bluetooth. It is understood that there may be multiple wireless transceivers 121 and wireless antenna 122 to support multiple protocols and communications standards.

Also illustrated in FIG. 21, certain embodiments of mobile terminal 100 may contain a Satellite Positioning System receiver (SPS receiver 155) capable of receiving Satellite Positioning System signals (SPS signals 159) via SPS antenna 158. SPS receiver 155 may also process, in whole or in part, the SPS signals 159 and use the SPS signals 159 to determine the location of mobile terminal 100. SPS receiver 155 communicates with other components of mobile terminal 100 through an interface 117.

In some embodiments, general-purpose processor(s) 111, memory 116, DSP(s) 112 and specialized processors (not shown) may also be utilized to process the SPS signals 159, in whole or in part, and/or calculate the location of the mobile terminal 100, in conjunction with SPS receiver 155. The storage of SPS or other location signals may be done in memory 116 or registers.

Also shown in FIG. 21, mobile terminal 100 may contain DSP(s) 112 connected to the bus 101 by a bus interface 109, general-purpose processor(s) 111 connected to the bus 101 by a bus interface 109 and memory 116, also sometimes connected to the bus by a bus interface 109. The bus interface 109 may be integrated with the DSP(s) 112, general-purpose processor(s) 111 and memory 116 with which they are associated. In various embodiments, functions may be stored as one or more instructions or code in memory 116 such as on a computer-readable storage medium, such as RAM, ROM, FLASH, or disc drive, and executed by general-purpose processor(s) 111, specialized processors, or DSP(s) 112. For example, memory 116 may contain the modules of FIG. 2 (namely, the expected measurement map reception unit 110, the matrix reception unit 120, the measurement capture unit 130, the interim vector computation unit 140, joint probability distribution computation unit 150, and the filter 160). Memory 116 is a processor-readable memory and/or a computer-readable memory that stores software code (programming code, instructions, etc.) configured to cause the processor(s) 111 and/or DSP(s) 112 to perform functions described.

In certain implementations, as shown in FIGS. 1 and 21, a mobile terminal 100 may receive SPS signals 159 from SPS Satellites 260. In some embodiments, the SPS Satellites may be from one global navigation satellite system (GNSS), such as the GPS or Galileo satellite systems. In other embodiments, the SPS Satellites may be from multiple GNSS such as, but not limited to, GPS, Galileo, GLONASS, or Beidou (Compass) satellite systems.

The term "location" is used herein, in the context of estimating a position of a mobile terminal. As such, the term "location" is not to be considered an exact position. Therefore, concepts, such as a concept of a mobile terminal being "in" a location does not imply that the mobile terminal is exactly in one physical position or another, but rather refers to a vicinity or region that may vary in extent based on the implementation and the particular circumstances. Further, the ultimate estimated position does not need to correspond exactly to a hypothesis location, but rather can be another position, as estimated based on the available data, processed as described in the disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile terminal for estimating a position of the mobile terminal, the method comprising:
   receiving an expected measurement map indicative of expected measurement values of a parameter;
   receiving parameters of a matrix $R_{nn}$ corresponding to the expected measurement map;
   capturing actual measurement values of the parameter for a plurality of communication devices; and
   utilizing the received parameters and the actual measurement values to estimate a position of the mobile terminal,
   wherein the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices, and
   wherein utilizing the received parameters and the actual measurement values to estimate the position of the mobile terminal further comprises
      computing, for each of a plurality of hypothesis locations, an interim vector ($\vec{Y}_{i,j}$) from the actual measurements and the expected measurement map,
      computing a joint probability distribution value ($P_{i,j}$) as an exponential of a matrix product of $\vec{Y}_{i,j}$ and $R_{nn}$, and
      filtering the joint probability distribution value to estimate the position of the mobile terminal.

2. The method of claim 1 wherein computing the respective interim vector comprises removing an unknown antenna gain of the mobile terminal.

3. The method of claim 1 wherein computing the respective interim vector comprises removing an unknown processing delay of the plurality of communication devices.

4. A mobile terminal for estimating a position of the mobile terminal, the mobile terminal comprising:
   means for receiving an expected measurement map indicative of expected measurement values of a parameter;
   means for receiving parameters of a matrix $R_{nn}$ corresponding to the expected measurement map;
   means for capturing actual measurement values of the parameter for a plurality of communication devices; and
   means for utilizing the received parameters and actual measurement values to estimate a position of the mobile terminal,
   wherein the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices, and
   wherein the means for utilizing the received parameters and the actual measurement values to estimate a position of the mobile terminal further comprise
      means for computing, for each of a plurality of hypothesis locations, an interim vector ($\vec{Y}_{i,j}$) from the actual measurements and the expected measurement map,
      means for computing a joint probability distribution value ($P_{i,j}$) as an exponential of a matrix product of $\vec{Y}_{i,j}$ and matrix $R_{nn}$, and
      means for filtering the joint probability distribution value to estimate the position of the mobile terminal.

5. The mobile terminal of claim 4 wherein the means for computing the respective interim vector comprises means for removing an unknown antenna gain of the mobile terminal.

6. The mobile terminal of claim 4 wherein the means for computing the respective interim vector comprises means for removing an unknown processing delay of the plurality of communication devices.

7. A device comprising:
   a processor;
   a transceiver operable to send and receive wireless signals, wherein the processor is coupled to receive data from the transceiver; and
   a non-transitory memory having stored thereon instructions for configuring the processor to:
      receive an expected measurement map indicative of expected measurement values of a parameter;
      receive parameters of a matrix $R_{nn}$ corresponding to the expected measurement map;
      capture actual measurement values of the parameter for a plurality of communication devices; and
      utilize the received parameters and actual measurement values to estimate a position of the mobile terminal,
      wherein the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices, and wherein the instructions for configuring the processor to utilize the received parameters and the actual measurement values to estimate the position of the mobile terminal further comprise instructions for configuring the processor to compute, for each of a plurality of hypothesis locations, an interim vector ($\vec{Y}_{i,j}$) from the actual measurements and the expected measurement map, compute a joint probability distribution value ($P_{i,j}$) as an exponential of a matrix product of $\vec{Y}_{i,j}$ and $R_{nn}$, and filter the joint probability distribution value to estimate the position of the mobile terminal.

8. The device of claim 7 wherein the instructions for configuring the processor to compute the respective interim vector comprise instructions for configuring the processor to remove an unknown antenna gain of the mobile terminal.

9. The device of claim 7 wherein the instructions for configuring the processor to compute the respective interim vector comprise instructions for configuring the processor to remove an unknown processing delay of the plurality of communication devices.

10. A non-transitory computer-readable medium, having stored thereon computer-readable instructions for estimating a position of the mobile terminal, comprising instructions configured to cause a computer to:

receive an expected measurement map indicative of expected measurement values of a parameter;

receive parameters of a matrix $R_{nn}$ corresponding to the expected measurement map;

capture actual measurement values of the parameter for a plurality of communication devices; and utilize the received parameters and actual measurement values to estimate a position of the mobile terminal, wherein the expected measurement map comprises, for each of a plurality of hypothesis locations (Loc(i,j)), a set of expected measurement values ($\vec{\mu}_{Loc(i,j)}$) containing expected measurements for the parameter, each of the expected measurements corresponding to a respective communication device of the plurality of communication devices, and wherein the instructions configured to cause the computer to utilize the received parameters and the actual measurement values to estimate the position of the mobile terminal further comprise instructions configured to cause the computer to compute, for each of a plurality of hypothesis locations, an interim vector ($\vec{Y}_{i,j}$) from the actual measurements and the expected measurement map;

compute a joint probability distribution value ($P_{i,j}$) as an exponential of a matrix product of $\vec{Y}_{i,j}$ and $R_{nn}$; and filter the joint probability distribution value to estimate the position of the mobile terminal.

11. The non-transitory computer-readable storage medium of claim 10 wherein the instructions to cause the computer to compute the interim vector further comprise instructions to cause the computer to remove an unknown antenna gain of the mobile terminal.

12. The non-transitory computer-readable storage medium of claim 10 wherein the instructions to cause the computer to compute the interim vector further comprise instructions to cause the computer to remove an unknown processing delay of the plurality of communication devices.

13. A method in a mobile terminal for estimating a position of the mobile terminal, the method comprising:

receiving an expected measurement map indicative of an expected measurement values of a parameter by the mobile terminal;

receiving parameters values of a matrix corresponding to the expected measurement map;

capturing, by the mobile terminal, actual measurement values of the parameter for a plurality of communication devices; and utilizing the received parameter values and the actual measurement values to estimate the position of the mobile terminal, wherein utilizing the received parameters and the actual measurement values to estimate the position of the mobile terminal further comprises computing, for each of a plurality of hypothesis locations, an interim vector using the actual measurement values and the expected measurement map, computing a joint probability distribution value using the interim vector and the matrix corresponding to the expected measurement map, and filtering, with a Kalman filter, the joint probability distribution value to estimate the position of the mobile terminal.

14. The method of claim 13, wherein receiving the expected measurement map comprises receiving a set of expected measurement values associated with one of the plurality of communication devices and a plurality of hypothesis locations.

15. The method of claim 13, wherein receiving the expected measurement map comprises receiving a set of expected measurement values associated with the plurality of communication devices and a hypothesis location.

16. The method of claim 13, wherein the method is implemented in a server in communication with the mobile terminal, and further comprising receiving, from the mobile terminal, captured measurements, from the position of the mobile terminal, for the plurality of communication devices.

17. A mobile terminal for estimating a position of the mobile terminal, the mobile terminal comprising:

means for receiving an expected measurement map indicative of an expected measurement values of a parameter by the mobile terminal;

means for receiving parameters values of a matrix corresponding to the expected measurement map;

means for capturing, by the mobile terminal, actual measurement values of the parameter for a plurality of communication devices; and means for utilizing the received parameter values and the actual measurement values to estimate the position of the mobile terminal, wherein the means for utilizing the received parameters and the actual measurement values to estimate the position of the mobile terminal further comprises means for computing, for each of a plurality of hypothesis locations, an interim vector using the actual measurement values and the expected measurement map, means for computing a joint probability distribution value using the interim vector and the matrix corresponding to the expected measurement map, and filtering, with a Kalman filter, the joint probability distribution value to estimate the position of the mobile terminal.

18. The mobile terminal of claim 17, wherein the means for receiving the expected measurement map comprises means for receiving a set of expected measurement values associated with one of the plurality of communication devices and a plurality of hypothesis locations.

19. The mobile terminal of claim 17, wherein the means for receiving the expected measurement map comprises means for receiving a set of expected measurement values associated with the plurality of communication devices and a hypothesis location.

20. A device comprising:
a processor;
a transceiver operable to send and receive wireless signals, wherein the processor is coupled to receive data from the transceiver; and
a non-transitory memory having stored thereon instructions for configuring the processor to:
receive an expected measurement map indicative of an expected measurement values of a parameter by the mobile terminal;
receive parameters values of a matrix corresponding to the expected measurement map;
capture, by the mobile terminal, actual measurement values of the parameter for a plurality of communication devices; and
utilize the received parameter values and the actual measurement values to estimate a position of the mobile terminal, wherein the processor is further configured to
compute, for each of a plurality of hypothesis locations, an interim vector using the actual measurement values and the expected measurement map,
compute a joint probability distribution value using the interim vector and the matrix corresponding to the expected measurement map, and
filter, with a Kalman filter, the joint probability distribution value to estimate the position of the mobile terminal.

21. The device of claim 20, wherein the instructions for configuring the processor to receive the expected measurement map comprise instructions for configuring the processor to receive a set of expected measurement values associated with one of the plurality of communication devices and a plurality of hypothesis locations.

22. The device of claim 20, wherein the instructions for configuring the processor to receive the expected measurement map comprise instructions for configuring the processor to receive a set of expected measurement values associated with the plurality of communication devices and a hypothesis location.

23. A non-transitory computer-readable medium, having stored thereon computer-readable instructions for estimating a position of the mobile terminal, comprising instructions configured to cause a computer to:
receive an expected measurement map indicative of an expected measurement values of a parameter by the mobile terminal;
receive parameters values of a matrix corresponding to the expected measurement map;
capture, by the mobile terminal, actual measurement values of the parameter for a plurality of communication devices; and
utilize the received parameter values and the actual measurement values to estimate the position of the mobile terminal, wherein the instructions configured to cause the computer to utilize the received parameter values and the actual measurement values to estimate the position of the mobile further comprise instructions configured to cause the computer to
compute, for each of a plurality of hypothesis locations, an interim vector using the actual measurement values and the expected measurement map,
compute a joint probability distribution value using the interim vector and the matrix corresponding to the expected measurement map, and
filter, with a Kalman filter, the joint probability distribution value to estimate the position of the mobile terminal.

24. The non-transitory computer-readable storage medium of claim 23, wherein the instructions configured to cause the computer to receive the expected measurement map comprise instructions to cause the computer to receive a set of expected measurement values associated with one of the plurality of communication devices and a plurality of hypothesis locations.

25. The non-transitory computer-readable storage medium of claim 23, wherein the instructions configured to cause the computer to receive the expected measurement map comprise instructions to cause the computer to receive a set of expected measurement values associated with the plurality of communication devices and a hypothesis location.

* * * * *